US011922962B2

(12) United States Patent
Beack et al.

(10) Patent No.: US 11,922,962 B2
(45) **Date of Patent: *Mar. 5, 2024**

(54) UNIFIED SPEECH/AUDIO CODEC (USAC) PROCESSING WINDOWS SEQUENCE BASED MODE SWITCHING

(71) Applicants: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR)

(72) Inventors: Seungkwon Beack, Daejeong (KR); Tae Jin Lee, Daejeon (KR); Min Je Kim, Daejeon (KR); Kyeongok Kang, Daejeon (KR); Dae Young Jang, Daejeon (KR); Jeongil Seo, Daejeon (KR); Jin Woo Hong, Daejeon (KR); Chieteuk Ahn, Daejeon (KR); Ho Chong Park, Seoul (KR); Young-cheol Park, Wonju-si (KR)

(73) Assignees: ELECTRONICS AND TELECOMMUNICATIONS RESEARCH INSTITUTE, Daejeon (KR); KWANGWOON UNIVERSITY INDUSTRY-ACADEMIC COLLABORATION FOUNDATION, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,256

(22) Filed: Aug. 25, 2022

(65) Prior Publication Data

US 2022/0406321 A1 Dec. 22, 2022

Related U.S. Application Data

(63) Continuation of application No. 16/835,728, filed on Mar. 31, 2020, now Pat. No. 11,430,458, which is a (Continued)

(30) Foreign Application Priority Data

Nov. 26, 2008 (KR) ........................ 10-2008-0118230
Dec. 24, 2008 (KR) ........................ 10-2008-0133007

(Continued)

(51) Int. Cl.
*G10L 19/022* (2013.01)
*G10L 19/06* (2013.01)

(Continued)

(52) U.S. Cl.
CPC ............ *G10L 19/22* (2013.01); *G10L 19/022* (2013.01); *G10L 19/06* (2013.01); *G10L 19/18* (2013.01)

(58) Field of Classification Search
CPC ....... G10L 19/22; G10L 19/022; G10L 19/06; G10L 19/18
See application file for complete search history.

(56) References Cited

U.S. PATENT DOCUMENTS 5,848,391 A 12/1998 Bosi
7,987,089 B2 * 7/2011 Krishnan ............ G10L 19/0212 704/214

(Continued)

FOREIGN PATENT DOCUMENTS

CN 101231820 A 7/2008
EP 1 647 009 B1 12/2006

(Continued)

OTHER PUBLICATIONS

Lee et al., "Technical description of the ETRI proposal for the unified speech and audio coding", International Organisation for Standardisation Organisation Internationale De Normalisation ISO/IEC JTC1/SC29/WG11 Coding of Moving Pictures and Audio, Jul. 2008, Hannover, Germany, 9 pages.

(Continued)

*Primary Examiner* — Abul K Azad
(74) *Attorney, Agent, or Firm* — STAAS & HALSEY LLP

(57) ABSTRACT

A Unified Speech and Audio Codec (USAC) that may process a window sequence based on mode switching is (Continued)

provided. The USAC may perform encoding or decoding by overlapping between frames based on a folding point when mode switching occurs. The USAC may process different window sequences for each situation to perform encoding or decoding, and thereby may improve a coding efficiency.

10 Claims, 39 Drawing Sheets

Related U.S. Application Data continuation of application No. 15/980,012, filed on May 15, 2018, now Pat. No. 10,622,001, which is a continuation of application No. 15/200,404, filed on Jul. 1, 2016, now Pat. No. 10,002,619, which is a continuation of application No. 14/588,638, filed on Jan. 2, 2015, now Pat. No. 9,384,748, which is a continuation of application No. 13/131,424, filed as application No. PCT/KR2009/007011 on Nov. 26, 2009, now Pat. No. 8,954,321.

(30) Foreign Application Priority Data

Jan. 19, 2009 (KR) ........................ 10-2009-0004243
Feb. 3, 2009 (KR) ........................ 10-2009-0008590
Nov. 25, 2009 (KR) ........................ 10-2009-0114783

(51) Int. Cl.
*G10L 19/18* (2013.01)
*G10L 19/22* (2013.01)

(56) References Cited

U.S. PATENT DOCUMENTS

| | | | | |
|---|---|---|---|---|
| 8,954,321 | B1 * | 2/2015 | Beack | G10L 19/022 704/219 |
| 9,384,748 | B2 * | 7/2016 | Beack | G10L 19/22 |
| 10,002,619 | B2 * | 6/2018 | Beack | G10L 19/18 |
| 10,622,001 | B2 * | 4/2020 | Beack | G10L 19/06 |
| 11,430,458 | B2 * | 8/2022 | Beack | G10L 19/22 |
| 2002/0007273 | A1 | 1/2002 | Chen | |
| 2004/0133423 | A1 | 7/2004 | Crockett | |
| 2005/0071402 | A1 | 3/2005 | Youn | |
| 2005/0185850 | A1 | 8/2005 | Vinton | |
| 2006/0195314 | A1 | 8/2006 | Taleb et al. | |
| 2007/0147518 | A1 | 6/2007 | Bessette | |
| 2008/0027719 | A1 | 1/2008 | Kirshnan | |
| 2008/0133242 | A1 | 6/2008 | Sung | |
| 2009/0299757 | A1 | 12/2009 | Guo et al. | |
| 2009/0319283 | A1 | 12/2009 | Schnell | |
| 2010/0217607 | A1 | 8/2010 | Neuendorf | |
| 2011/0173008 | A1 | 7/2011 | Lecomte | |
| 2011/0173010 | A1 * | 7/2011 | Lecomte | G10L 19/20 704/500 |
| 2011/0238426 | A1 | 9/2011 | Fuchs et al. | |

FOREIGN PATENT DOCUMENTS

| | | | |
|---|---|---|---|
| WO | 2004/008806 | A1 | 1/2004 |
| WO | 2008/017135 | A1 | 2/2008 |
| WO | 2008/071353 | | 6/2008 |

OTHER PUBLICATIONS

"Call for Proposals on Unified Speech and Audio Coding", International Organisation for Standardisation Organisation Internationale De Normalisation ISO/IEC JTC1/SC29/WG11 Coding of Moving Pictures and Audio, Oct. 2007, Shenzhen, China, 6 pages.

M. Neuendorf et al., "Unified Speech and Audio Coding Scheme for High Quality at Low Bitrates", IEEE International Conference on Acoustics, Speech, and Signal Processing, IEEE, Apr. 19, 2009, Taipei, Taiwan, pp. 1-4.

U.S. Office Action dated Dec. 19, 2013 in copending U.S. Appl. No. 13/131,424.

U.S. Final Office Action dated May 29, 2014 in copending U.S. Appl. No. 13/131,424.

U.S. Notice of Allowance dated Sep. 24, 2014 in copending U.S. Appl. No. 13/131,424.

U.S. Office Action dated Oct. 7, 2015 in copending U.S. Appl. No. 14/588,638.

Notice of Allowance dated Mar. 7, 2016 in copending U.S. Appl. No. 14/588,638.

U.S. Notice of Allowance dated Feb. 16, 2018 in U.S. Appl. No. 15/200,404.

U.S. Office Action dated Nov. 17, 2017 in U.S. Appl. No. 15/200,404.

U.S. Office Action dated Jul. 3, 2017 in U.S. Appl. No. 15/200,404.

U.S. Office Action dated Jan. 26, 2017 in U.S. Appl. No. 15/200,404.

U.S. Office Action dated Jul. 9, 2019 in U.S. Appl. No. 15/980,012.

U.S. Notice of Allowance dated Dec. 9, 2019 in U.S. Appl. No. 15/980,012.

U.S. Office Action dated Dec. 9, 2021 in U.S. Appl. No. 16/835,728.

U.S. Notice of Allowance dated Apr. 27, 2022 in U.S. Appl. No. 16/835,728.

U.S. Appl. No. 16/835,728, filed Mar. 31, 2020, Seungkwon Beack et al.,

U.S. Appl. No. 15/980,012 (now U.S. Pat. No. 10,622,001), filed May 15, 2018, Seungkwon Beack et al., Electronics and Telecommunications Research Institute and Kwangwoon University Industry-Academic Collaboration Foundation.

U.S. Appl. No. 15/200,404 (now U.S. Pat. No. 10,002,619), filed Jul. 1, 2016, Seungkwon Beack et al., Electronics and Telecommunications Research Institute and Kwangwoon University Industry-Academic Collaboration Foundation.

U.S. Appl. No. 14/588,638 (now U.S. Pat. No. 9,384,748), filed Jan. 2, 2015, Seungkwon Beack et al., Electronics and Telecommunications Research Institute and Kwangwoon University Industry-Academic Collaboration Foundation.

U.S. Appl. No. 13/131,424 (now U.S. Pat. No. 8,954,321), filed May 26, 2011, Seungkwon Beack et al., Electronics and Telecommunications Research Institute and Kwangwoon University Industry-Academic Collaboration Foundation.

* cited by examiner

| INDEX | window_sequence | num_ windows | looks like |
|---|---|---|---|
| 0 | ONLY_LONG_SEQUENCE = LONG_WINDOW | 1 |  |
| 1 | LONG_START_SEQUENCE =LONG_START_WINDOW | 1 |  |
| 2 | EIGHT_SHORT_SEQUENCE =8 *SHORT_WINDOW | 8 |  |
| 3 | LONG_STOP_SEQUENCE = LONG_STOP_WINDOW | 1 |  |
| 1 | STOP_START_SEQUENCE =STOP_START_WINDOW | 1 |  |
| 3 | LPD_START_SEQUENCE =START_WINDOW_LPD | 1 |  |
| 3 | STOP_1152_SEQUENCE =STOP_WINDOW_1152 | 1 |  |
| 1 | STOP_START_1152_SEQUENCE =STOP_START_WINDOW_1152 | 1 |  |

(a)

(b)

(c)

STOP_1024_SEQUENCE (a)

(b)

LPD_MODE = {1,0,2,2}

LPD_MODE={3,3,3,3} && prev_LPD_MODE={x,x,x,0}

(a)

(b)

UNIFIED SPEECH/AUDIO CODEC (USAC) PROCESSING WINDOWS SEQUENCE BASED MODE SWITCHING

CROSS-REFERENCE TO RELATED APPLICATIONS

This application is a continuation application of U.S. patent application Ser. No. 16/835,728, filed on Mar. 31, 2020, which is a continuation application of U.S. patent application Ser. No. 15/980,012, filed on May 15, 2018, which is a continuation application of U.S. patent application Ser. No. 15/200,404, filed Jul. 1, 2016, which is a continuation of U.S. patent application Ser. No. 14/588,638, filed Jan. 2, 2015, which is a continuation application of U.S. patent application Ser. No. 13/131,424, filed May 26, 2011, which is a national phase application, under 35 U.S.C. 371, of international application No. PCT/KR2009/007011, filed Nov. 26, 2009, which is related to and claims the priority benefit of Korean Patent Application No. 10-2008-0118230, filed on Nov. 26, 2008, in the Korean Intellectual Property Office, Korean Patent Application No. 10-2008-0133007, filed on Dec. 24, 2008, in the Korean Intellectual Property Office, Korean Patent Application No. 10-2009-0004243, filed on Jan. 19, 2009, in the Korean Intellectual Property Office, Korean Patent Application No. 10-2009-0008590, filed on Feb. 3, 2009, in the Korean Intellectual Property Office, and Korean Patent Application No. 10-2009-0114783, filed on Nov. 25, 2009, in the Korean Intellectual Property Office, the disclosures of which are incorporated herein by reference.

BACKGROUND

1. Field

The present invention relates to a method of processing a window sequence to perform encoding or decoding when a mode switching occurs in a Modified Discrete Cosine Transform (MDCT)-based Unified Speech and Audio Codec (USAC).

2. Description of the Related Art

When an encoding or decoding method varies depending on a characteristic of an input signal, a Unified Speech and Audio Codec (USAC) may improve a coding performance. In this instance, in the USAC, a speech coder may perform encoding/decoding with respect to a signal, similar to a speech from among input signals, and an audio coder may perform encoding/decoding with respect to a signal similar to an audio.

A USAC may process an input signal based on mode switching between Linear Prediction Domain (LPD) modes. Also, the USAC may process an input signal based on mode switching between an LPD mode and a Frequency Domain (FD) mode. The USAC may process a signal by applying a window sequence to a frame of an input signal based on mode switching. However, a window sequence processing method that may improve a coding efficiency in comparison with a USAC in a conventional art.

SUMMARY

Disclosure of Invention

Technical Goals

An aspect of the present invention provides a Unified Speech and Audio Codec (USAC) that may perform encoding/decoding by applying a sequence where an overlap-add region between frames is extended, when mode switching occurs between Linear Prediction Domain (LPD) modes.

An aspect of the present invention also provides a USAC that may perform encoding/decoding by applying a sequence where an overlap-add region among frames is extended, when mode switching occurs between an LPD mode and a Frequency Domain (FD) mode.

Technical Solutions

According to an aspect of the present invention, there is provided a Unified Speech and Audio Codec (USAC), including: a mode switching unit to perform switching between Linear Prediction Domain (LPD) modes with respect to sub-frames included in a frame of an input signal; and an encoding unit to encode the input signal by applying a window to a current sub-frame to be coded from among the sub-frames based on the switched LPD mode. The encoding unit may encode the input signal by applying the window to the current sub-frame, and the window may change based on an LPD mode of a previous sub-frame and an LPD mode of a next sub-frame.

According to an aspect of the present invention, there is provided a USAC, including: a mode switching unit to switch from a Frequency Domain (FD) mode to an LPD mode with respect to a frame of an input signal; and an encoding unit to perform encoding by performing overlap-add with respect to a window sequence of the FD mode and a window sequence of the LPD mode based on a folding point.

According to an aspect of the present invention, there is provided a USAC, including: a mode switching unit to switch an LPD mode to a FD mode with respect to a frame of an input signal; and an encoding unit to perform encoding by performing overlap-add with respect to a window sequence of the FD mode and a window sequence of the LPD mode based on a folding point.

According to an aspect of the present invention, there is provided a USAC, including: a mode switching unit to perform switching between LPD modes with respect to sub-frames included in a frame of an input signal; and a decoding unit to decode the input signal by applying a window to a current sub-frame to be decoded from among the sub-frames based on the switched LPD mode. The decoding unit may decode the input signal by applying the window to the current sub-frame, and the window may change based on an LPD mode of a previous sub-frame and an LPD mode of a next sub-frame.

According to an aspect of the present invention, there is provided a USAC, including: a mode switching unit to switch from a FD mode to an LPD mode with respect to a frame of an input signal; and a decoding unit to perform decoding by performing overlap-add with respect to a window sequence of the FD mode and a window sequence of the LPD mode based on a folding point.

According to an aspect of the present invention, there is provided a USAC, including: a mode switching unit to switch an LPD mode to a FD mode with respect to a frame of an input signal; and a decoding unit to perform decoding by performing overlap-add with respect to a window sequence of the FD mode and a window sequence of the LPD mode based on a folding point.

Advantageous Effects

According to an embodiment of the present invention, a Unified Speech and Audio Codec (USAC) may affect a block artifact less than a window sequence processed in a USAC in a conventional art, and obtain an improved coding gain using a Time Domain Aliasing Cancellation (TDAC) of Modified Discrete Cosine Transform (MDCT).

BRIEF DESCRIPTION OF THE DRAWINGS

These and/or other aspects and advantages of the invention will become apparent and more readily appreciated from the following description of the embodiments, taken in conjunction with the accompanying drawings of which

DETAILED DESCRIPTION OF EMBODIMENTS

Figure 1:
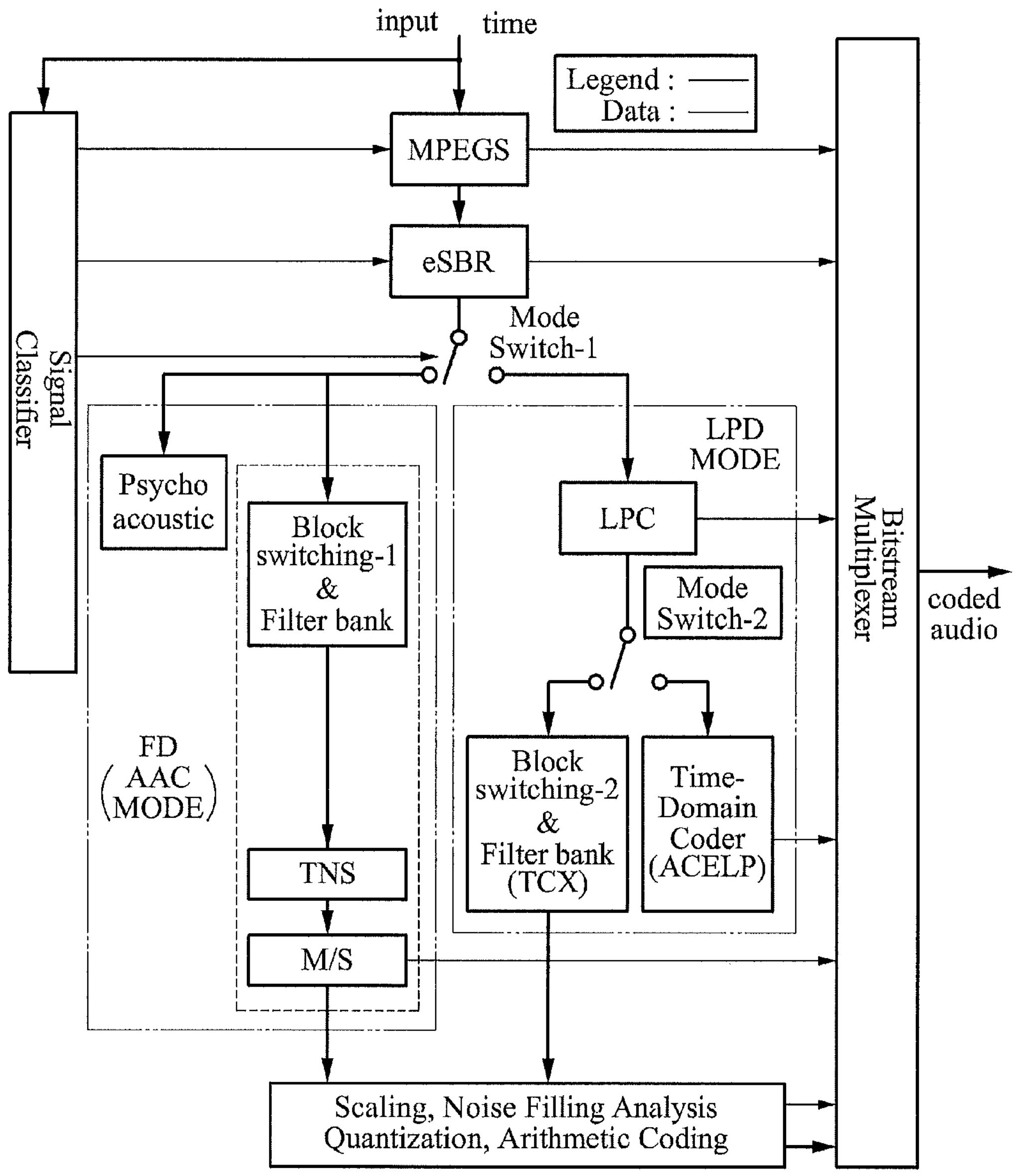
FIG. 1 is a block diagram illustrating a configuration of a Unified Speech and Audio Codec (USAC) according to an embodiment of the present invention.

Best Mode for Carrying Out the Invention

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a configuration of a Unified Speech and Audio Codec (USAC) according to an embodiment of the present invention.

The USAC of FIG. 1 may perform different encoding methods depending on a characteristic of an input signal, and thereby may improve an encoding performance and a sound quality. For example, the USAC may encode a signal, which is similar to a speech from among input signals, based on a Code Excited Linear Prediction (CELP), and thereby may improve a coding efficiency. Also, the USAC may encode a signal, similar to an audio from among input signals, and thereby may improve a coding efficiency.

In FIG. 1, a Moving Picture Experts Groups Surrounds (MPEGs) may be used to code a stereo signal, and perform One-To-Two (OTT) of an MPEG Surround. Also, an enhanced Spectral Band Replication (eSBR) may extend a bandwidth of the input signal by analyzing a high frequency component. A Mode switch-1 may correspond to a signal classifier, and determine whether a current frame of the input signal is a speech signal or an audio signal. Here, a signal analyzer may determine whether the input signal is similar to the speech signal or the audio signal, and select an encoding depending on the characteristic of the signal. It may be assumed that the USAC includes the signal analyzer which is ideally operated.

When the current frame of the input signal is determined to be similar to the audio, the Mode switch-1 may switch the current frame to an Advanced Audio Coding mode (AAC MODE) which is a Frequency Domain (FD) mode. Also, the current frame may be encoded based on the AAC-MODE. In the ACC-MODE, the input signal may be basically encoded according to a psychoacoustic model. Also, a Blocks switching-1 may differently apply a window to the current frame depending on the characteristic of the input signal. In this instance, the window may be determined based on a coding mode of a previous frame or a next frame. A filter bank may perform Time to Frequency (T/F) transform with respect to the current frame where the window is applied. The filter bank may perform encoding by basically applying a Modified Discrete Cosine Transform (MDCT) to improve an encoding efficiency.

Conversely, when it is determined that the current frame of the input signal is similar to the speech, the Mode switch-1 may switch the current frame into a Linear Prediction Domain mode (LPD MODE). The current frame may be encoded based on a Linear Prediction Coding (LPC). When mode switching occurs between LPD modes, a Blockswitching-2 may apply a window to each sub-frame depending on the LPD modes. In an Enhanced Adaptive Multi-Rate Wideband (AMR-WB+) or USAC, the current frame of the input signal may include four sub-frames in an LPD mode. Here, the current frame of the input signal may be defined as a super-frame signal. A window sequence according to an embodiment of the present invention may be defined as a combined window of at least one window which is applied to sub-frames included in a super-frame.

For example, when a super-frame is processed as a single sub-frame, lpd_mode, that is, an LPD mode of the super-frame may be determined to be {3, 3, 3, 3}. In this instance, a window sequence may include a single window. When the super-frame is processed as two sub-frames, the LPD mode of the super-frame may be determined to be {2, 2, 2, 2}. In this instance, the window sequence may include two windows. When the super-frame is processed as four sub-frames, the LPD mode of the super-frame may be determined to be {1, 1, 1, 1}. In this instance, the window sequence may include four windows.

When lpd_mode=0, a single sub-frame may be encoded based on an Algebraic Code Excited Linear Prediction (ACELP). When an ACELP is applied, a T/F transform and a window may not be applied. That is, encoding according to an LPC-based LPD mode may be performed using a Transform Code eXcitation (TCX) block based on the filter bank and an ACELP block based on a time domain coding. A filter bank method may include an MDCT and a Discrete Fourier Transform (DFT) method. According to an embodiment of the present invention, an MDCT-based TCX may be used. A method of processing a window sequence in the Blockswitching-1 and the Blockswitching-2 is described in detail.

Figure 2:
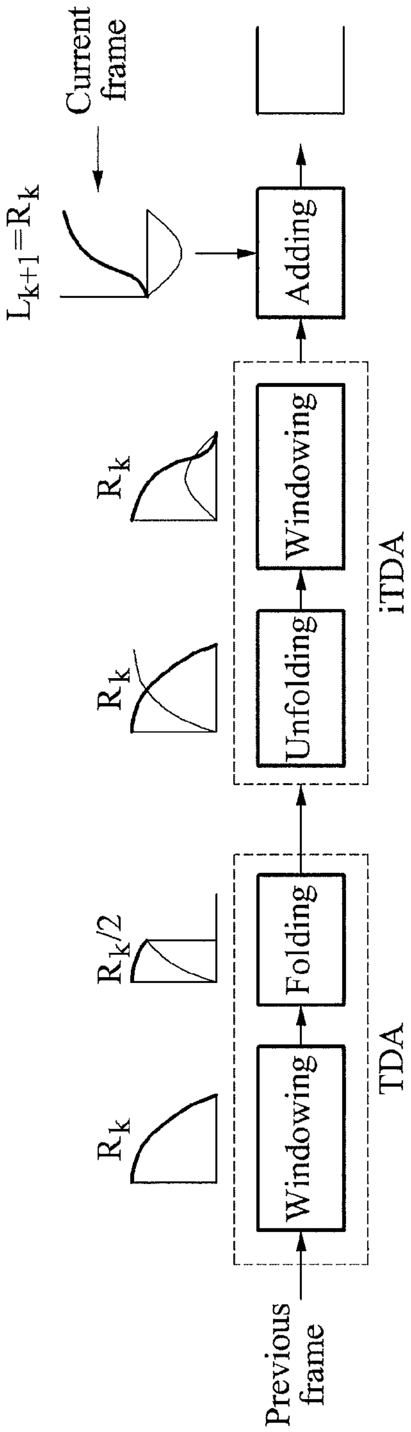
FIG. 2 is a diagram illustrating a Modified Discrete Cosine Transform (MDCT)-based Time Domain Aliasing Cancellation (TDAC)

FIG. 2 is a diagram illustrating an MDCT-based Time Domain Aliasing Cancellation (TDAC).

An MDCT may be a T/F transform which is widely used for an audio encoder. In the MDCT, a bit rate may not increase even when an overlap-add is performed among frames. However, since the MDCT may generate an aliasing in a time domain, the MDCT may be a TDAC transform that may restore the input signal after the input signal is inverse-transformed from a frequency domain to a time domain, and then 50% overlap-add is performed with respect to a window and a frame adjacent to a current frame.

Referring to FIG. 2, the MDCT may be performed with respect to the input signal after windowing. When the MDCT is performed, an aliasing may be generated in the time domain. In FIG. 2, $R_k$ may denote a right portion of a window applied to the input signal. When the MDCT is performed with respect to the input signal, folding may be performed based on $R_k/2$, and thus a Time Domain Aliasing (TDA) may be generated. Subsequently, when an Inverse MDCT (IMDCT) is performed with respect to the input signal, the window may be unfolded to $R_k$. After TDA is generated, the unfolded window may be different from an initial window.

However, after windowing-MDCT-IMDCT-windowing is performed with respect to a next frame like the current frame, when an overlap-add is performed with respect to a left signal of the next frame where the window is applied and a right signal of the current frame where the window is applied, the input signal where the TDA is canceled may be extracted. The above-described overlap-add may be used to cancel the aliasing in a TDA condition. To apply the overlap-add and TDAC, a point where frames where a window is applied are overlap-added may be a point where the window is folded. In this instance, the folding point may be $R_k$.

Figure 3:
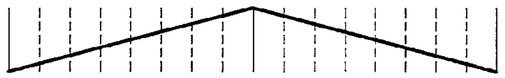
FIG. 3 is a diagram illustrating a window sequence defined in a Reference Model (RM) in a conventional art.
Figure 3:
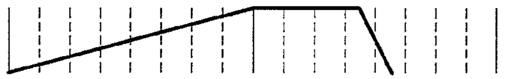
Figure 3:
Figure 3:
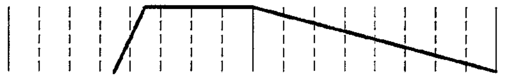
Figure 3:
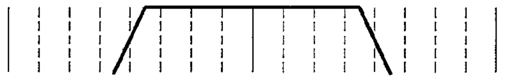
Figure 3:
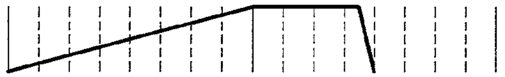
Figure 3:
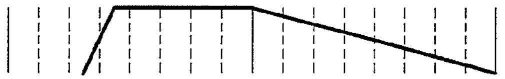
Figure 3:
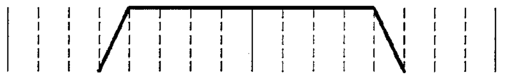

FIG. 3 is a diagram illustrating a window sequence defined in a Reference Model (RM) in a conventional art.

FIG. 3 illustrates the window applicable to the Block-switching-1 of FIG. 1. In an index 2 of FIG. 3, eight SHORT_WINDOWs are included in a single set, and thereby may be represented as a window sequence. In another transform mode, a single window may be included in a single window sequence. As illustrated in FIG. 3, a window sequence is represented under assumptions of a triangle window. When N, a length of a current frame, is set as 2048, intervals between dotted lines may be 128. However, in 'STOP_START_1152_SEQUENCE', the length of the current frame may be set as 2304.

Figure 4:
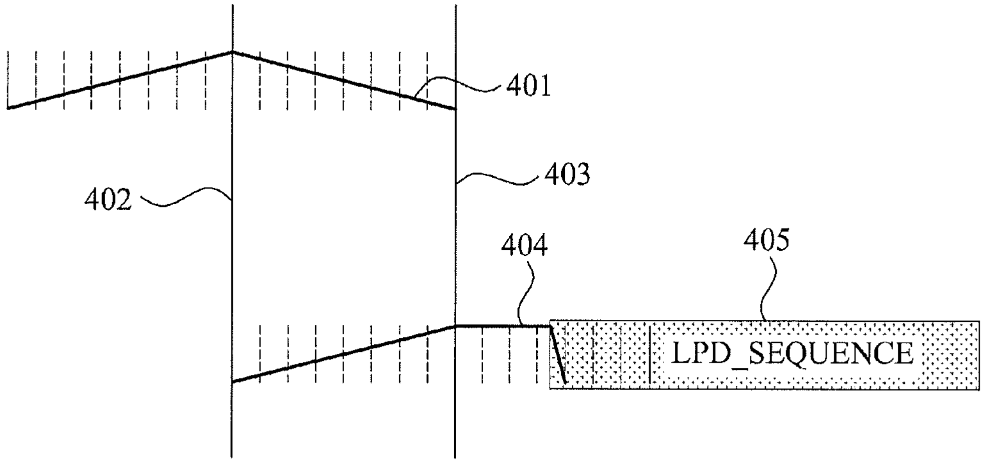
FIG. 4 is a diagram illustrating a window sequence 'CASE 1: ONLY_LONG_SEQUENCE to LPD_START_SEQUENCE'.

FIG. 4 is a diagram illustrating a window sequence 'CASE 1: ONLY_LONG_SEQUENCE to LPD_START_SEQUENCE'.

According to an RM of USAC, 'ONLY_LONG_SEQUENCE' 401 may be defined to appear prior to 'LPD_START_SEQUENCE' 404, and 'LPD_START_SEQUENCE' 404 may appear prior to 'LPD_SEQUENCE'. Here, 'LPD_SEQUENCE' may appear in a region 405.

'LPD_SEQUENCE' may indicate a window sequence where an LPD mode is applied. Here, a region between a line 402 and a line 403 may indicate a region where two neighboring window sequences are overlap-added when an input signal is restored by a decoder.

Figure 5:
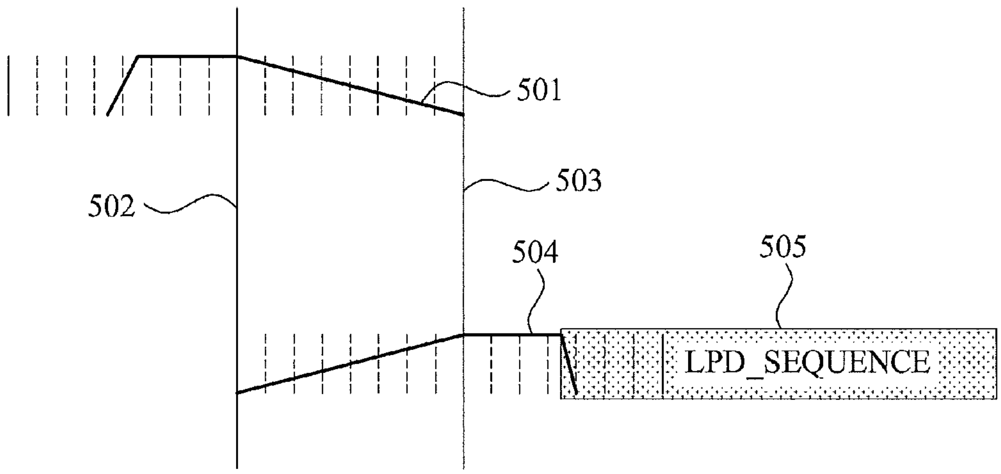
FIG. 5 is a diagram illustrating a window sequence 'CASE 2: LONG_STOP_SEQUENCE to LPD_START_SEQUENCE'.

FIG. 5 is a diagram illustrating a window sequence 'CASE 2: LONG_STOP_SEQUENCE to LPD_START_SEQUENCE'.

According to an RM of USAC, 'LONG_STOP_SEQUENCE' 501 may be defined to appear prior to 'LPD_START_SEQUENCE' 504, and 'LPD_START_SEQUENCE' 504 may appear prior to 'LPD_SEQUENCE'. Here, 'LPD_SEQUENCE' may appear in a region 505.

As FIG. 4, 'LPD_SEQUENCE' may indicate a window sequence generated in an LPD mode. Here, a region between a line 502 and a line 503 may indicate a region where two neighboring windows are overlap-added when an input signal is restored by a decoder.

Figure 6:
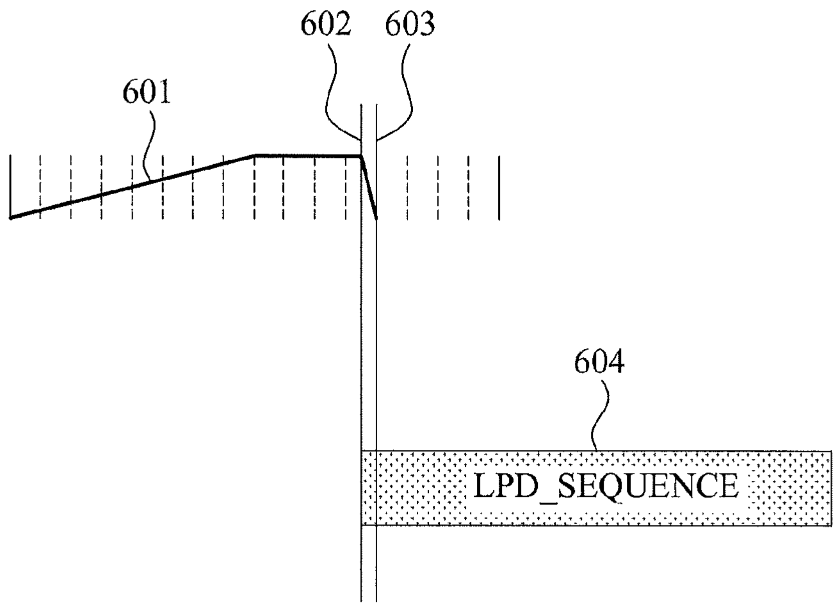
FIG. 6 is a diagram illustrating a window sequence 'CASE 3: LPD_START_SEQUENCE to LPD_SEQUENCE' when mode switching occurs from a Frequency Domain (FD) to a Linear Prediction Domain (LPD) mode.

FIG. 6 is a diagram illustrating a window sequence 'CASE 3: LPD_START_SEQUENCE to LPD_SEQUENCE' when mode switching occurs from a FD to an LPD mode.

According to an RM of USAC, 'LPD_START_SEQUENCE' 601 may be defined to appear prior to 'LPD_SEQUENCE'. 'LPD_START_SEQUENCE' 601 may indicate a last window where an AAC MODE is applied, when mode switching occurs from the AAC MODE to an LPC MODE in a Mode switch-1. Here, the ACC MODE may be a FD mode, and the LPC MODE may be an LPD mode. 'LPD_SEQUENCE' may appear in a region 604.

As FIG. 4, 'LPD_SEQUENCE' may indicate a window sequence where the LPD mode is applied. Here, a region between a line 602 and a line 603 may indicate a region where two neighboring window sequences are overlap-added when an input signal is restored by a decoder. In this instance, a size of regions where a window sequence is overlap-added may be 64 points.

Figure 7:
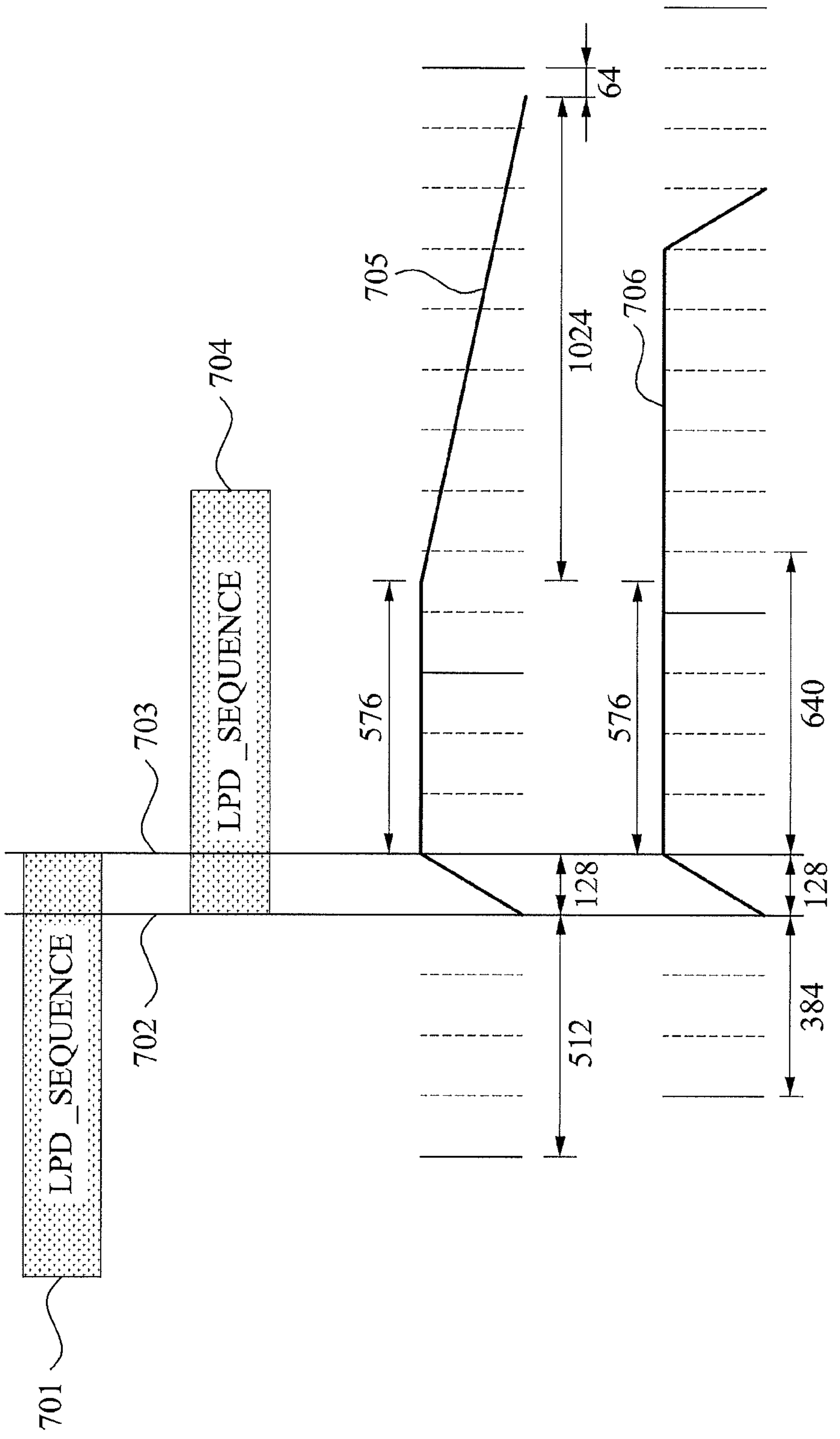
FIG. 7 is a diagram illustrating a window sequence 'CASE 4: LPD_SEQUENCE to LPD_SEQUENCE' when mode switching occurs from an LPD mode to an LPD mode, and a window sequence 'CASE 4: LPD_SEQUENCE to STOP_1152_SEQUENCE or STOP_START_1152_SEQUENCE' when mode switching occurs from an LPD mode to a FD mode.

FIG. 7 is a diagram illustrating a window sequence 'CASE 4: LPD_SEQUENCE to LPD_SEQUENCE' when mode switching occurs from an LPD mode to an LPD mode, and a window sequence 'CASE 4: LPD_SEQUENCE to STOP_1152_SEQUENCE or STOP_START_1152_SEQUENCE' when mode switching occurs from an LPD mode to a FD mode.

According to an RM of USAC, 'LPD_SEQUENCE' where the LPD mode is applied may be defined to appear in a region 701 and another 'LPD_SEQUENCE' may appear in a region 704. In FIG. 7, a region where 'LPD_SEQUENCE' and another 'LPD_SEQUENCE' are overlap-added may be between a line 702 and a line 703. A size of the overlap-added region may be 128 points.

Also, as illustrated in FIG. 7, 'LPD_SEQUENCE' where the LPD mode is applied may appear in the region 701, and 'STOP_1152_SEQUENCE' 705 where an ACC MODE is applied may appear after 'LPD_SEQUENCE'. Also, 'LPD_SEQUENCE' where the LPD mode is applied may appear in the region 701, and 'STOP_START_1152_SEQUENCE' 706 where the ACC MODE is applied may appear after 'LPD_SEQUENCE'.

According to an embodiment of the present invention, a window sequence processing method and a method of processing 'LPD_SEQUENCE' may be provided with respect to CASE 3 and CASE 4. CASE 3 may be associated with when a FD mode is changed to an LPD mode, which is described in detail with reference to FIGS. 13 through 16. CASE 4 may be associated with when the LPD mode is changed to the FD mode, which is described in detail with reference to FIGS. 20 through 24. 'LPD_SEQUENCE' is described in detail with reference to FIGS. 8 through 12. CASE 3 and CASE 4 may be associated with a window sequence processing method when mode switching occurs between the LPD mode and the FD mode. The Blockswitching-1 of FIG. 1 may process a window sequence. Also, 'LPD_SEQUENCE' may denote a window sequence when mode switching occurs between LPD modes. The Block-switching-2 of FIG. 1 may process a window sequence.

In the mode switching between LPD modes, a USAC may include a mode switching unit to perform switching between LPD modes with respect to sub-frames included in a frame of an input signal, and an encoding unit to encode the input signal by applying a window based on the switched LPD mode to a current sub-frame to be coded from among the sub-frames.

In this instance, the mode switching unit may correspond to the Mode switch-2 of FIG. 1, and the encoding unit may correspond to the Blockswitching-2 of FIG. 1. The encoding unit may encode the input signal by applying a window to the current sub-frame. Here, the window may be changed according to an LPD mode of a previous sub-frame and an LPD mode of a next sub-frame. Also, the encoding unit may perform overlap-add between the sub-frames based on a folding point located in a boundary of the sub-frames.

For example, when an LPD mode of the current sub-frame is 1 and the LPD mode of the previous sub-frame or the next sub-frame is different from 0, the encoding unit may perform encoding using the window which is applied to the current sub-frame. Here, the window may include a region which is overlap-added to the previous sub-frame or the next sub-frame, and a size of the region may be 256.

Also, when the LPD mode of the current sub-frame is 2 and the LPD mode of the previous sub-frame or the next sub-frame is different from 0, the encoding unit may perform encoding using the window which is applied to the current sub-frame. Here, the window may include a region which is overlap-added to the previous sub-frame or the next sub-frame, and a size of the region may be 512.

Also, when the LPD mode of the current sub-frame is 3 and the LPD mode of the previous sub-frame or the next sub-frame is different from 0, the encoding unit may perform encoding using the window which is applied to the current sub-frame. Here, the window may include a region which is overlap-added to the previous sub-frame or the next sub-frame, and a size of the region may be 1024.

When the LPD mode of the previous sub-frame is 0, the encoding unit may process a left portion of the window, which is applied to the current sub-frame, as a rectangular shape having a value of 1. When the LPD mode of the next sub-frame is 0, the encoding unit may process a right portion of the window, which is applied to the current sub-frame, as a rectangular region having a value of 1.

In this instance, the encoding unit may perform overlap-add between the sub-frames based on a folding point located in a boundary of the sub-frames.

In the mode switching from the FD mode to the LPD mode, a USAC may include a mode switching unit to switch from a FD mode to an LPD mode with respect to a frame of an input signal, and an encoding unit to perform encoding by performing overlap-add with respect to a window sequence of the FD mode and a window sequence of the LPD mode based on a folding point.

In this instance, when an LPD mode of a starting sub-frame from among the window sequence of the LPD mode is 0, the encoding unit may replace a window corresponding to the starting sub-frame with a window corresponding to an LPD mode of 1.

Also, the encoding unit may shift the window sequence of the LPD mode to enable the window sequence of the LPD mode to be overlap-added to the window sequence of the FD mode based on the folding point.

Also, the encoding unit may change a shape of the window sequence of the FD mode based on the window sequence of the LPD mode.

Also, the encoding unit may perform overlap-add between the window sequences based on the folding point, located in a boundary of sub-frames included in the frame of the input signal, and extract an LPC at every sub-frame by setting the folding point as a starting point.

In the mode switching from the LPD mode to the FD mode, a USAC may include a mode switching unit to switch an LPD mode to a FD mode with respect to a frame of an input signal, and an encoding unit to perform encoding by performing overlap-add with respect to a window sequence of the FD mode and a window sequence of the LPD mode based on a folding point.

Also, the encoding unit may change the window sequence of the FD mode based on the window sequence of the LPD mode.

Also, the encoding unit may overlap the window sequence of the FD mode and the window sequence of the LPD mode by 256 points. Here, when an LPD mode of an end sub-frame from among the window sequence of the LPD mode is 0, a window corresponding to the end sub-frame may be replaced with a window corresponding to an LPD mode of 1.

Here, a USAC (decoding) may process a window sequence in a same way as the USAC (encoding) associated with the mode switching between LPD modes, mode switching from the FD mode to the LPD mode, and mode switching from the LPD mode to the FD mode. Hereinafter, the window sequence to be processed in the USAC(decoding) is described in detail.

Figure 8:
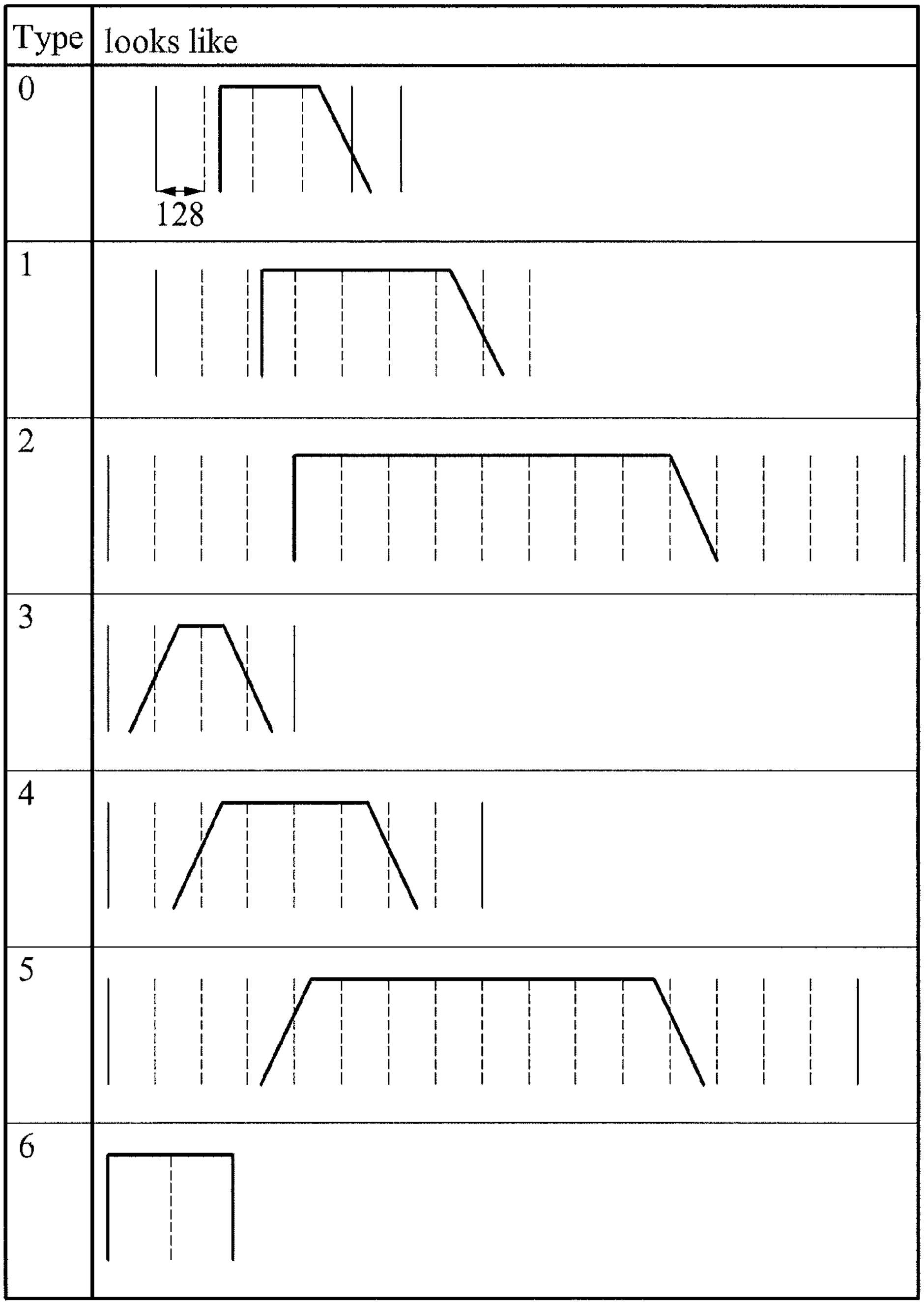
FIG. 8 is a diagram illustrating window shapes of 'LPD_SEQUENCE' for each type.

FIG. 8 is a diagram illustrating window shapes of 'LPD_SEQUENCE' for each type.

FIG. 8 illustrates the windows of 'LPD_SEQUENCE' described above with reference to FIGS. 4 through 7. 'LPD_SEQUENCE' illustrated in FIG. 8 may be defined in Table 1.

TABLE 1

| Type | Value of last_lpd_mode | value of mod[x] | Number lg of spectral coefficients | ZL | L | M | R | ZR |
|---|---|---|---|---|---|---|---|---|
| 0 | 0 | 1 | 320 | 160 | 0 | 256 | 128 | 96 |
| 1 | 0 | 2 | 576 | 288 | 0 | 512 | 128 | 224 |
| 2 | 0 | 3 | 1152 | 512 | 128 | 1024 | 128 | 512 |
| 3 | 1 . . . 3 | 1 | 256 | 64 | 128 | 128 | 128 | 64 |
| 4 | 1 . . . 3 | 2 | 512 | 192 | 128 | 384 | 128 | 192 |
| 5 | 1 . . . 3 | 3 | 1024 | 448 | 128 | 896 | 128 | 448 |

Table 1 defines a window shape of 'LPD_SEQUENCE' with respect to a current sub-frame that may change based on lpd_mode (last_lpd_mode) of a previous sub-frame. In Table 1, ZL may denote a length of a section corresponding to a zero block inserted in a left portion of the window in 'LPD_SEQUENCE'. Also, ZR may denote a length of a section corresponding to a zero block inserted in a right portion of the window in 'LPD_SEQUENCE'. M may denote a length of a period of a window having a value of '1' in 'LPD_SEQUENCE'. Also, L and R may denote a length of a section which is overlap-added to a window adjacent to each of a left portion and a right portion in 'LPD_SEQUENCE'. Here, the left portion and right portion may be divided based on a center point of each window. As shown in Table 1, 1024 or 1152 spectral coefficients may be generated with respect to a single frame.

When lpd_mode=0, 'LPD_SEQUENCE' of the current sub-frame may indicate a window of type 6 in FIG. 8, regardless of lpd_mode of the previous sub-frame. Here, the window of type 6 may be a rectangular window without a zero block. That is, when lpd_mode=0, an input signal may be encoded based on an ACELP. Also, when the input signal is restored, aliasing may not be generated, and a window for overlap-add may not be applied. Accordingly, an ACELP block of FIG. 1 may not perform block-switching differently from a TCX block.

Referring to FIG. 8, 26 types of 'LPD_SEQUENCE' may be generated with respect to a single super-frame. FIGS. 9 through 12 illustrate a portion of 26 types of 'LPD_SEQUENCE' that may be generated.

Figure 9:
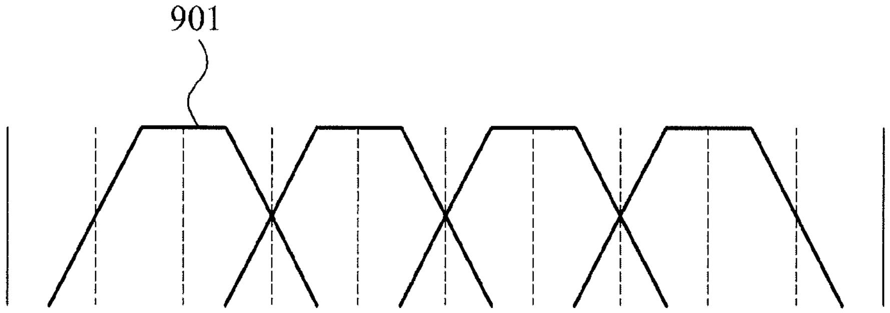
FIG. 9 is a diagram illustrating 'LPD_SEQUENCE' (a) when an LPD mode is {1, 1, 1, 1}, (b) when an LPD mode is {2, 2, 2, 2}, and (c) when an LPD mode is {3, 3, 3, 3}.
Figure 9:
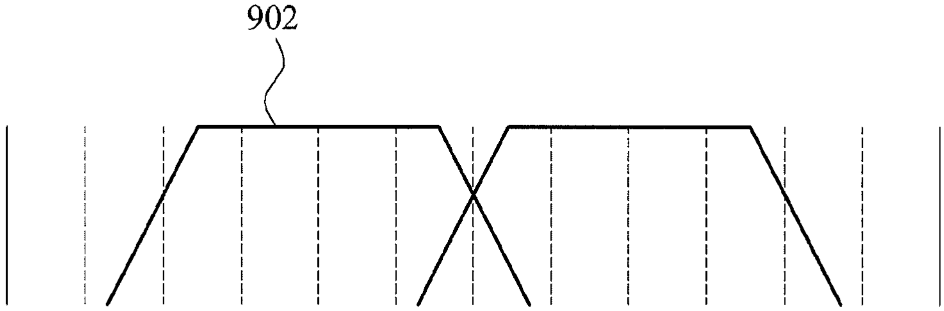
Figure 9:
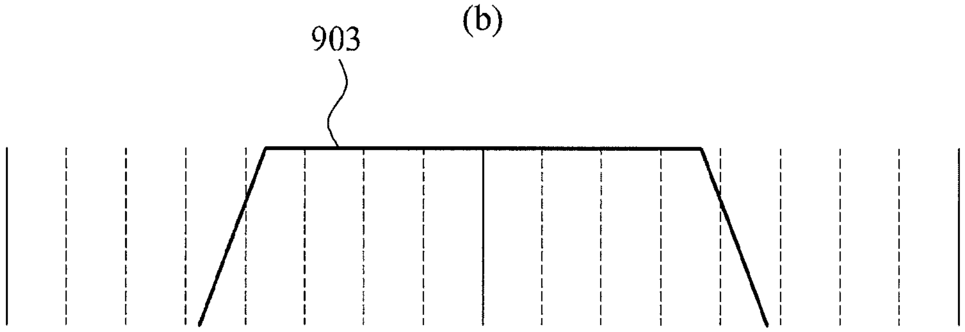

FIG. 9 is a diagram illustrating 'LPD_SEQUENCE' (a) when an LPD mode is {1, 1, 1, 1}, (b) when an LPD mode is {2, 2, 2, 2}, and (c) when an LPD mode is {3, 3, 3, 3}.

FIG. 9 (*a*) illustrates 'LPD_SEQUENCE' when lpd_mode of each sub-frame of a super-frame is all '1'. In this instance, 'LPD_SEQUENCE' of FIG. 9 (*a*) may include four windows 901 corresponding to a type 3 of FIG. 8. lpd_mode of 'LPD_SEQUENCE' of FIG. 9 (*a*) may be {1, 1, 1, 1}.

FIG. 9 (*b*) illustrates 'LPD_SEQUENCE' when lpd_mode of each sub-frame of a super-frame is all '2'. In this instance, 'LPD_SEQUENCE' of FIG. 9 (*b*) may include two windows 902 corresponding to a type 4 of FIG. 8. lpd_mode of 'LPD_SEQUENCE' of FIG. 9 (*b*) may be {2, 2, 2, 2}.

FIG. 9 (*c*) illustrates 'LPD_SEQUENCE' when lpd_mode of each sub-frame of a super-frame is all '3'. In this instance, 'LPD_SEQUENCE' of FIG. 9 (*c*) may include four windows 903 corresponding to a type 3 of FIG. 8. lpd_mode of 'LPD_SEQUENCE' of FIG. 9 (*c*) may be {3, 3, 3, 3}.

Figure 10:
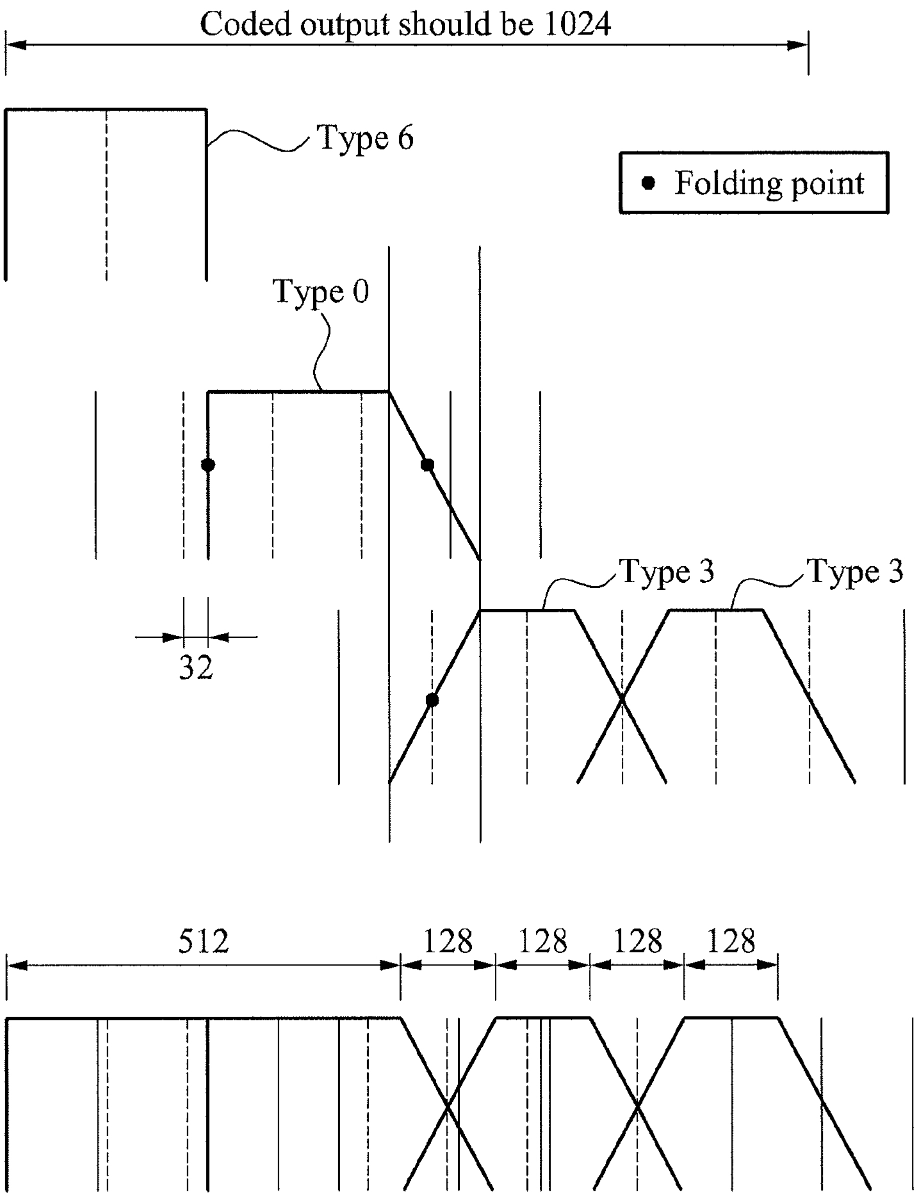
FIG. 10 is a diagram illustrating 'LPD_SEQUENCE' when an LPD mode is {0, 1, 1, 1}.

FIG. 10 is a diagram illustrating 'LPD_SEQUENCE' when an LPD mode is {0, 1, 1, 1}.

Figure 11:
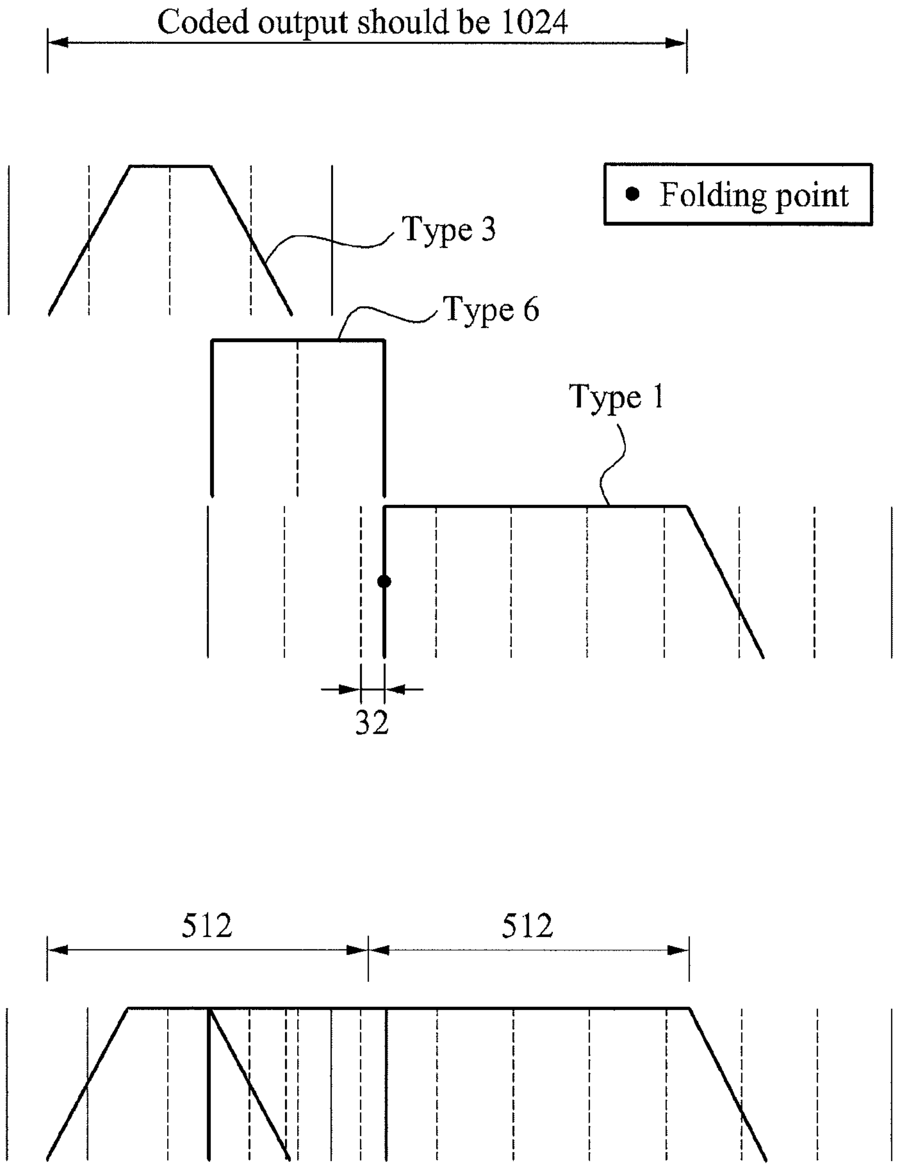
FIG. 11 is a diagram illustrating 'LPD_SEQUENCE' when an LPD mode is {1, 0, 2, 2}.

FIG. 11 is a diagram illustrating 'LPD_SEQUENCE' when an LPD mode is {1, 0, 2, 2}.

Figure 12:
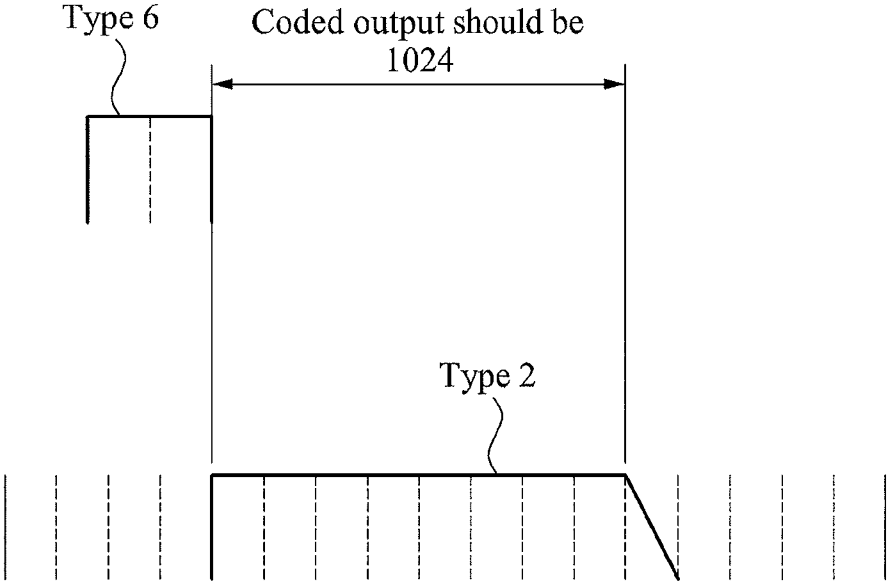
FIG. 12 is a diagram illustrating 'LPD_SEQUENCE' where an LPD mode is {3, 3, 3, 3}, when an LPD mode of an end sub-frame of a previous frame is {0}.

FIG. 12 is a diagram illustrating 'LPD_SEQUENCE' where an LPD mode is {3, 3, 3, 3}, when an LPD mode of an end sub-frame of a previous frame is {0}.

Figure 13:
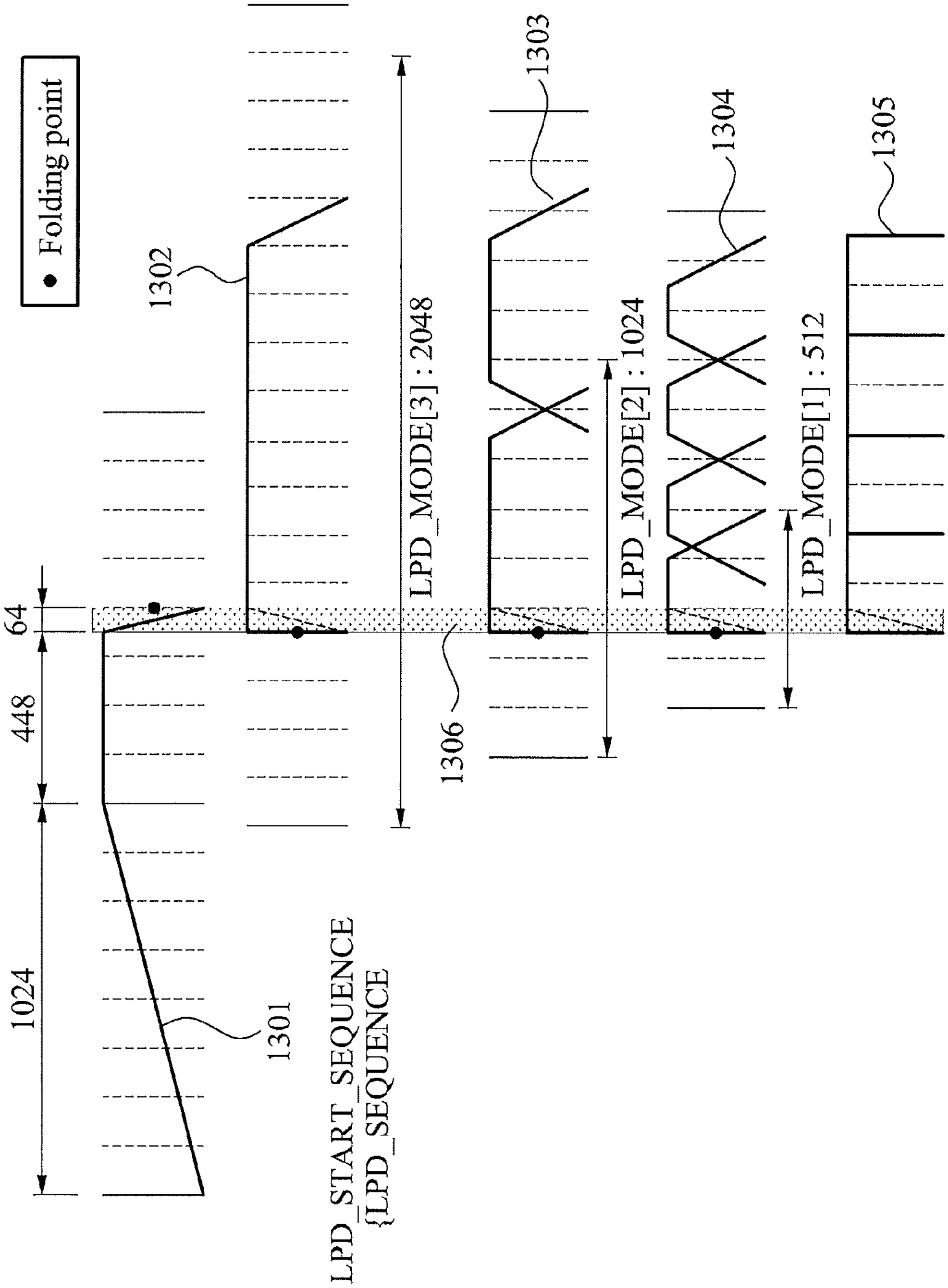
FIG. 13 is a diagram illustrating a window sequence processing method with respect to CASE 3 in a conventional art.

FIG. 13 is a diagram illustrating a window sequence processing method with respect to CASE 3 in a conventional art.

As described in FIG. 6, CASE 3 may be associated with when a window sequence processing is performed from 'LPD_START_SEQUENCE' 1301 to 'LPD_SEQUENCE' 1302, 1303, 1304, and 1305. In this instance, when mode switching occurs from the AAC MODE, which is the FD mode, to the LPC MODE, which is the LPD mode, in the Mode switch-1, 'LPD_START_SEQUENCE' 1301 may indicate a window sequence which is finally applied in the AAC MODE.

In FIG. 13, 'LPD_SEQUENCE' 1302 may be associated with when lpd_mode={3, 3, 3, 3}. 'LPD_SEQUENCE' 1303 may be associated with when lpd_mode={2, 2, 2, 2}. 'LPD_SEQUENCE' 1304 may be associated with when lpd_mode={1, 1, 1, 1}. 'LPD_SEQUENCE' 1305 may be associated with when lpd_mode={0, 0, 0, 0}. In FIG. 13, 'LPD_SEQUENCE' 1302, 1303, 1304, and 1305 may be overlap-added to 'LPD_START_SEQUENCE' 1301 based on a folding point at a region 1306 of 64-point after 'LPD_SEQUENCE' 1302, 1303, 1304, and 1305 are modified to a dotted line.

Figure 14:
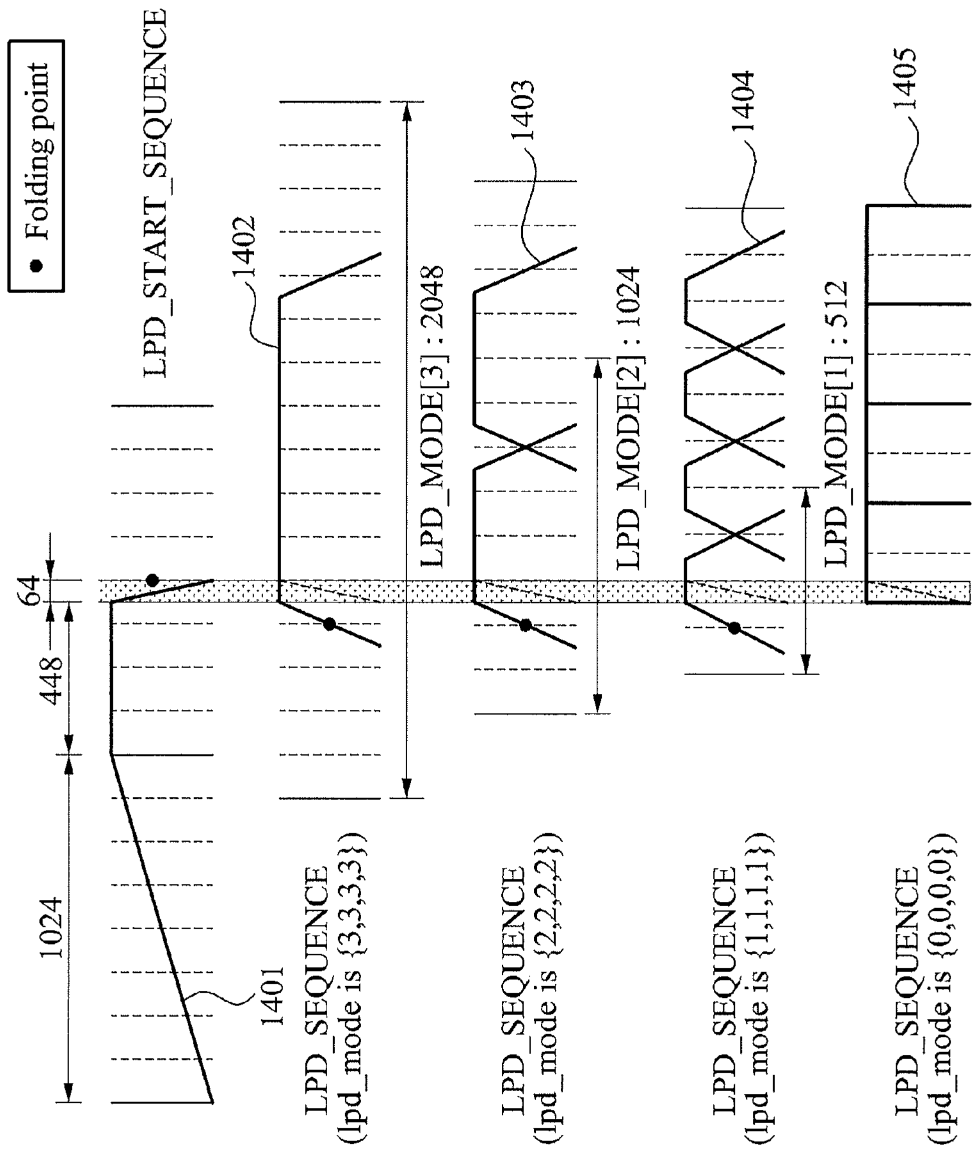
FIG. 14 is a diagram illustrating a first example of a window sequence processing method with respect to CASE 3 according to an embodiment of the present invention.

FIG. 14 is a diagram illustrating a first example of a window sequence processing method with respect to CASE 3 according to an embodiment of the present invention.

Referring to FIG. 14, 'LPD_START_SEQUENCE' 1401 may be overlap-added to 'LPD_SEQUENCE' 1402, 1403, 1404, and 1405 in a region 1406 regardless of TDAC. Accordingly, each 'LPD_SEQUENCE' 1402, 1403, 1404, and 1405 may be modified into a dotted line, and overlap-added to 'LPD_START_SEQUENCE' 1401 based on a folding point in the region 1406. In this instance, a size of the region 1406 may be 64 points.

The folding point may indicate a point where a window is folded since a TDA is generated, after MDCT and IMDCT are performed. That is, according to an embodiment of the present invention, in a right window of 'LPD_START_SEQUENCE' 1401, a TDA may not be generated even when MDCT and IMDCT are performed. Also, the right window of 'LPD_START_SEQUENCE' 1401 may be connected to a neighboring frame through overlap-adding after windowing.

Figure 15:
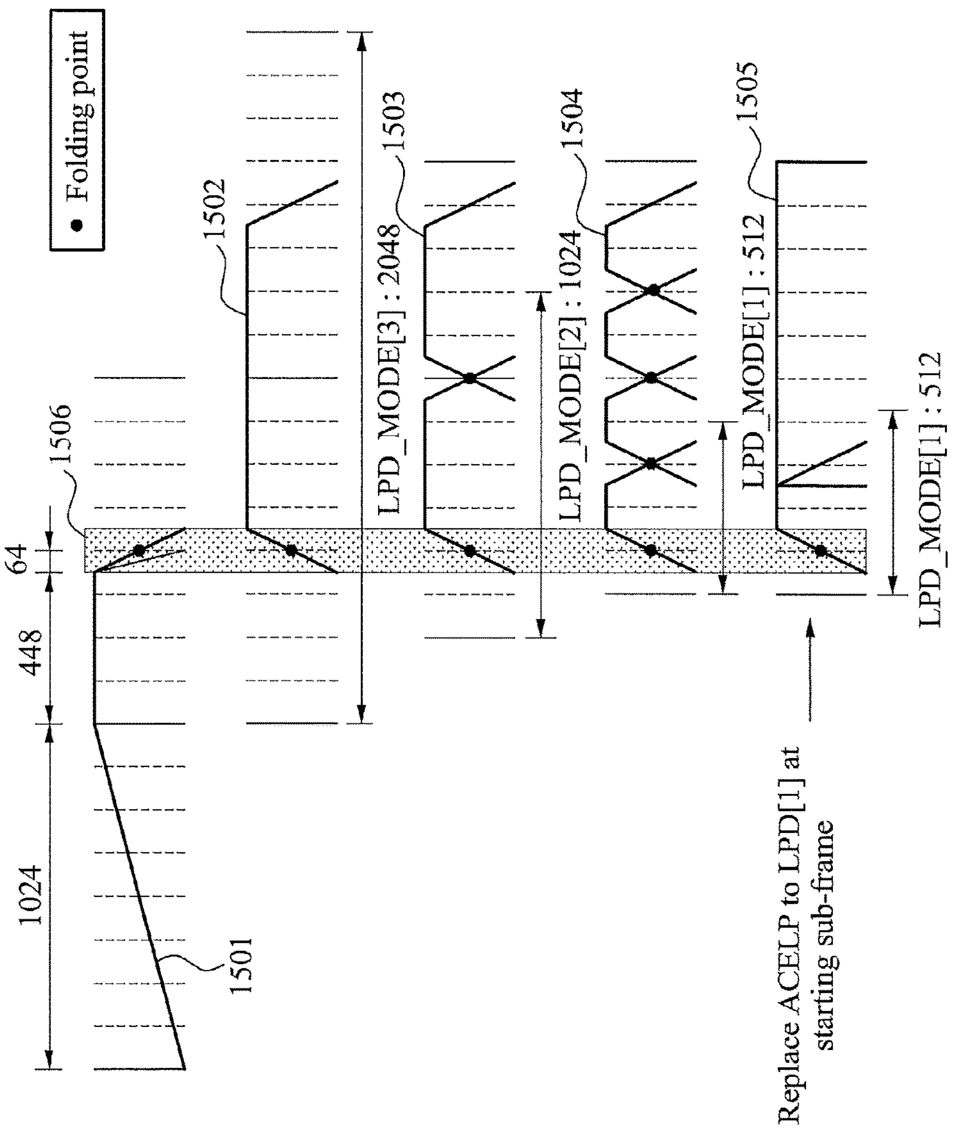
FIG. 15 is a diagram illustrating a second example of a window sequence processing method with respect to CASE 3 according to an embodiment of the present invention.

FIG. 15 is a diagram illustrating a second example of a window sequence processing method with respect to CASE 3 according to an embodiment of the present invention.

'LPD_SEQUENCE' 1502, 1503, 1504, and 1505, illustrated in FIG. 15, may be shifted by 128 points in a right direction than 'LPD_SEQUENCE' 1402, 1403, 1404, and 1405 of FIG. 14. That is, 'LPD_SEQUENCE' 1502, 1503, 1504, and 1505 may be overlap-added to 'LPD_START_SEQUENCE' 1501 based on a folding point without modification, differently from 'LPD_SEQUENCE' 1402, 1403, 1404, and 1405. Also, a size of an overlap-added region 1506 may be 128 points, which is greater than the region 1406 by 64 points. Also, 'LPD_SEQUENCE' 1502, 1503, 1504, and 1505 may be shifted by 64 points in a right direction than 'LPD_SEQUENCE' 1302, 1303, 1304, and 1305 of FIG. 13. In this instance, when lpd_mode of 'LPD_SEQUENCE' 1505 is {0, 0, 0, 0}, lpd_mode of a starting sub-frame of 'LPD_SEQUENCE' 1505 may be changed to '1'.

Referring to FIG. 15, when the Mode switching-1 performs mode switching from the AAC MODE to the LPD MODE, a window sequence of the AAC MODE, that is, 'LPD_START_SEQUENCE' 1501, may be connected to window sequences of the LPD MODE, that is, 'LPD_SEQUENCE' 1502, 1503, 1504, and 1505, based on an MDCT folding point. That is, 'LPD_SEQUENCE' 1502, 1503, 1504, and 1505 may be overlap-added to 'LPD_START_SEQUENCE' 1501 based on a TDA folding point in the region 1506, and thus an aliasing generated in a time domain may be canceled.

Accordingly, 'LPD_SEQUENCE' 1502, 1503, 1504, and 1505 may be shifted by 64 points in a right direction than 'LPD_SEQUENCE' 1302, 1303, 1304, and 1305, and be overlap-added. Also, 'LPD_SEQUENCE' 1502, 1503, 1504, and 1505 may be shifted by 128 points in a right direction in comparison with 'LPD_SEQUENCE' 1402, 1403, 1404, and 1405, and be overlap-added. That is, the window sequence processing in FIG. 15 may obtain a coding gain, which is greater than by 64 points when compared to the window sequence processing in FIG. 13, and which is greater than by 128 points when compared to the window sequence processing in FIG. 14, every time the Mode switch-1 of FIG. 1 performs mode switching from the FD mode to the LPD mode.

Accordingly, the window sequence processing method with respect to CASE 3 may be as follows:

(1) the window sequence 'LPD_START_SEQUENCE' of the FD mode and window sequence 'LPD_SEQUENCE' of the LPD mode may be overlap-added based on an MDCT folding point.

(2) a shape of a window corresponding to a region connected to 'LPD_SEQUENCE' in 'LPD_START_SEQUENCE' may be required to be changed to pass a folding point.

(3) a starting location of 'LPD_SEQUENCE' may be required to be shifted to be matched with an MDCT folding point by 64 points compared to 'LPD_SEQUENCE' of FIG. 13 and by 128 points compared to 'LPD_SEQUENCE' of FIG. 14.

(4) exceptionally, in 'LPD_SEQUENCE' starting from an ACELP sub-frame, the ACELP sub-frame may be replaced with a TCX20 (lpd_mode={1}).

Figure 16:
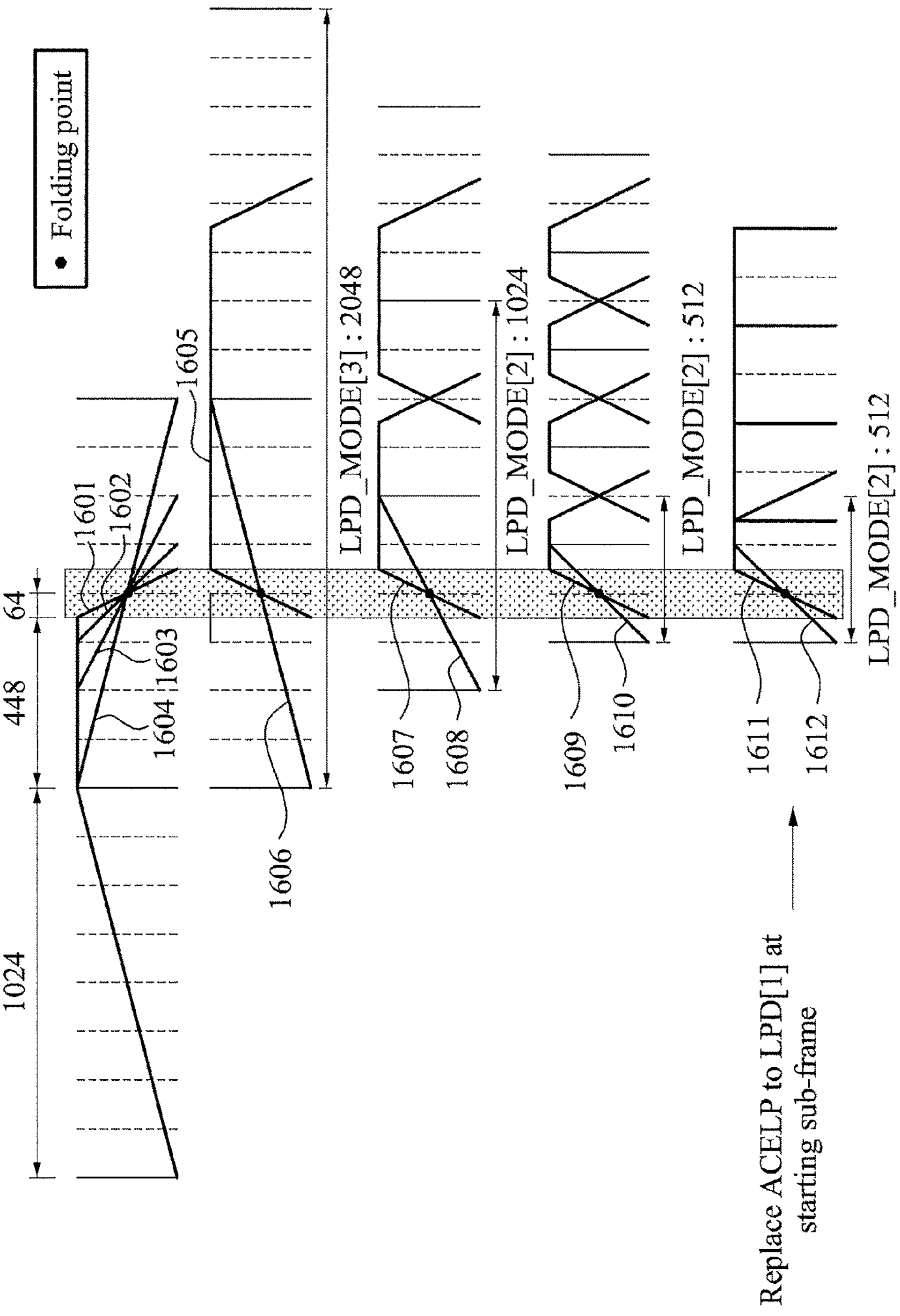
FIG. 16 is a diagram illustrating a third example of a window sequence processing method with respect to CASE 3 according to an embodiment of the present invention.

FIG. 16 is a diagram illustrating a third example of a window sequence processing method with respect to CASE 3 according to an embodiment of the present invention.

FIG. 16 illustrates a change of a window in a region which is overlap-added to 'LPD_SEQUENCE' in 'LPD_START_SEQUENCE' based on an LPD mode of 'LPD_SEQUENCE' of a next frame. That is, a shape of a right window of 'LPD_START_SEQUENCE' may be changed based on the LPD mode of 'LPD_SEQUENCE'. In FIG. 16, when the right window of 'LPD_START_SEQUENCE' is a line 1601, 'LPD_START_SEQUENCE' of FIG. 16 may have a same shape as 'LPD_START_SEQUENCE' 1501.

When an LPD mode of 'LPD_SEQUENCE' corresponding to a next frame is {3, 3, 3, 3}, a shape of a right window of 'LPD_START_SEQUENCE' corresponding to a current frame may change to a line 1604. Also, since the right window of 'LPD_START_SEQUENCE' changes, a left window of 'LPD_SEQUENCE' where the LPD mode is {3, 3, 3, 3} may change from a line 1605 to a line 1606. Accordingly, 'LPD_START_SEQUENCE' and 'LPD_SEQUENCE' may be overlap-added by 1024 points.

When an LPD mode of 'LPD_SEQUENCE' corresponding to a next frame is {2, 2, x, x}, a shape of a right window of 'LPD_START_SEQUENCE' corresponding to a current frame may change to a line 1603. Also, since the right window of 'LPD_START_SEQUENCE' changes, a left window of 'LPD_SEQUENCE' where the LPD mode is {2, 2, x, x} may change from a line 1607 to a line 1608. Accordingly, 'LPD_START_SEQUENCE' and 'LPD_SEQUENCE' may be overlap-added by 512 points.

When an LPD mode of 'LPD_SEQUENCE' corresponding to a next frame is {1, x, x, x}, a shape of a right window of 'LPD_START_SEQUENCE' corresponding to a current frame may change to a line 1602. Also, since the right window of 'LPD_START_SEQUENCE' changes, a left window of 'LPD_SEQUENCE' where the LPD mode is {1, x, x, x} may change from a line 1609 to a line 1610. Accordingly, 'LPD_START_SEQUENCE' and 'LPD_SEQUENCE' may be overlap-added by 1024 points.

When an LPD mode of 'LPD_SEQUENCE' corresponding to a next frame is {0, x, x, x}, an LPD mode of a starting sub-frame of 'LPD_SEQUENCE' may be replaced with '1'. In this instance, similarly to when the LPD mode of 'LPD_SEQUENCE' is {1, x, x, x}, the shape of the right window of 'LPD_START_SEQUENCE' corresponding to a current frame may change to the line 1602. Also, since the right window of 'LPD_START_SEQUENCE' changes, a left window of 'LPD_SEQUENCE' where the LPD mode is {0, x, x, x} may change from a line 1611 to a line 1612. Accordingly, 'LPD_START_SEQUENCE' and 'LPD_SEQUENCE' may be overlap-added by 512 points.

Figure 17:
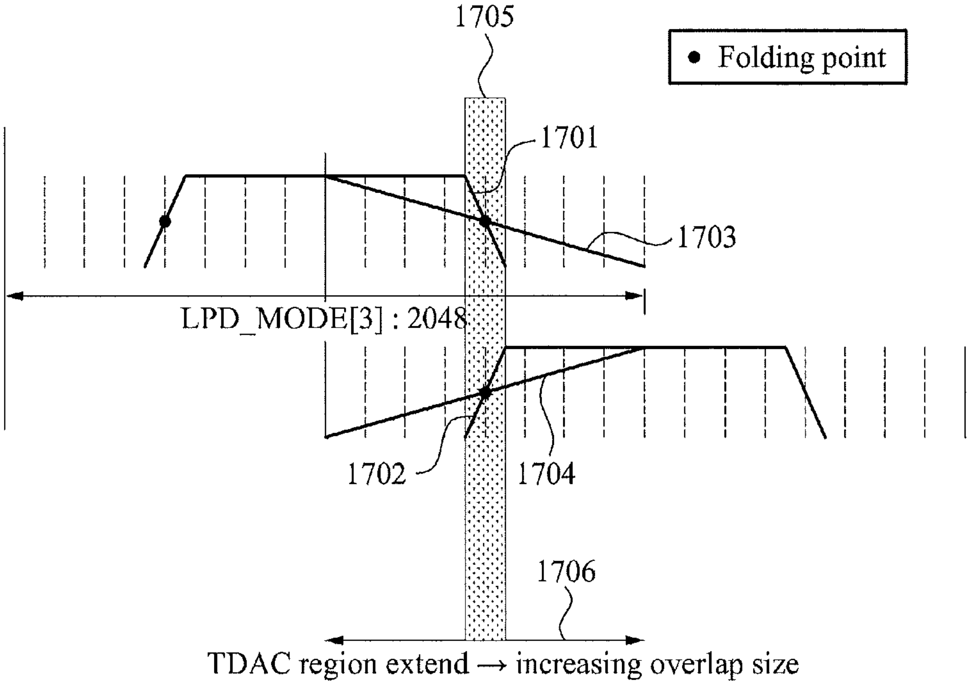
FIG. 17 is a diagram illustrating a window when an LPD mode of 'LPD_SEQUENCE' with respect to a current sub-frame is 3, and when an LPD mode of 'LPD_SEQUENCE' with respect to a next sub-frame is 3 according to an embodiment of the present invention.

FIG. 17 is a diagram illustrating a window when an LPD mode of 'LPD_SEQUENCE' with respect to a current sub-frame is 3, and an LPD mode of 'LPD_SEQUENCE' with respect to a next sub-frame is 3 according to an embodiment of the present invention.

Referring to FIG. 17, when the LPD mode of 'LPD_SEQUENCE' with respect to the next sub-frame is 3, a right window of 'LPD_SEQUENCE' with respect to the current sub-frame may change from a line 1701 to a line 1703. Also, a left window of 'LPD_SEQUENCE' corresponding to the next sub-frame may change from a line 1702 to a line 1704. Accordingly, a region 1705 where window sequences are overlap-added based on a folding point may be extended to a region 1706.

Figure 18:
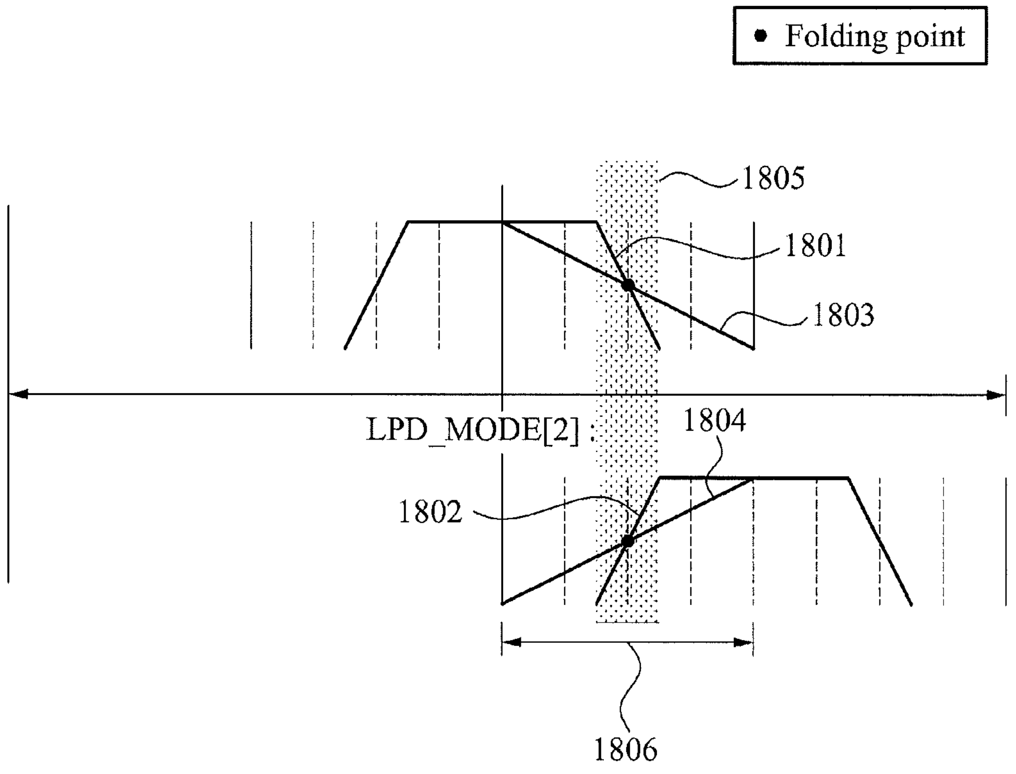
FIG. 18 is a diagram illustrating a window when an LPD mode of 'LPD_SEQUENCE' with respect to a current sub-frame is 2, and when an LPD mode of 'LPD_SEQUENCE' with respect to a next sub-frame is 2 according to an embodiment of the present invention.

FIG. 18 is a diagram illustrating a window when an LPD mode of 'LPD_SEQUENCE' with respect to a current sub-frame is 2, and an LPD mode of 'LPD_SEQUENCE' with respect to a next sub-frame is 2 according to an embodiment of the present invention.

Referring to FIG. 18, when the LPD mode of 'LPD_SEQUENCE' with respect to the next sub-frame is 2, a right window of 'LPD_SEQUENCE' with respect to the current sub-frame may change from a line 1801 to a line 1803. Also, a left window of 'LPD_SEQUENCE' corresponding to the next sub-frame may change from a line 1802 to a line 1804. Accordingly, a region 1805 where window sequences are overlap-added based on a folding point may be extended to a region 1806.

Figure 19:
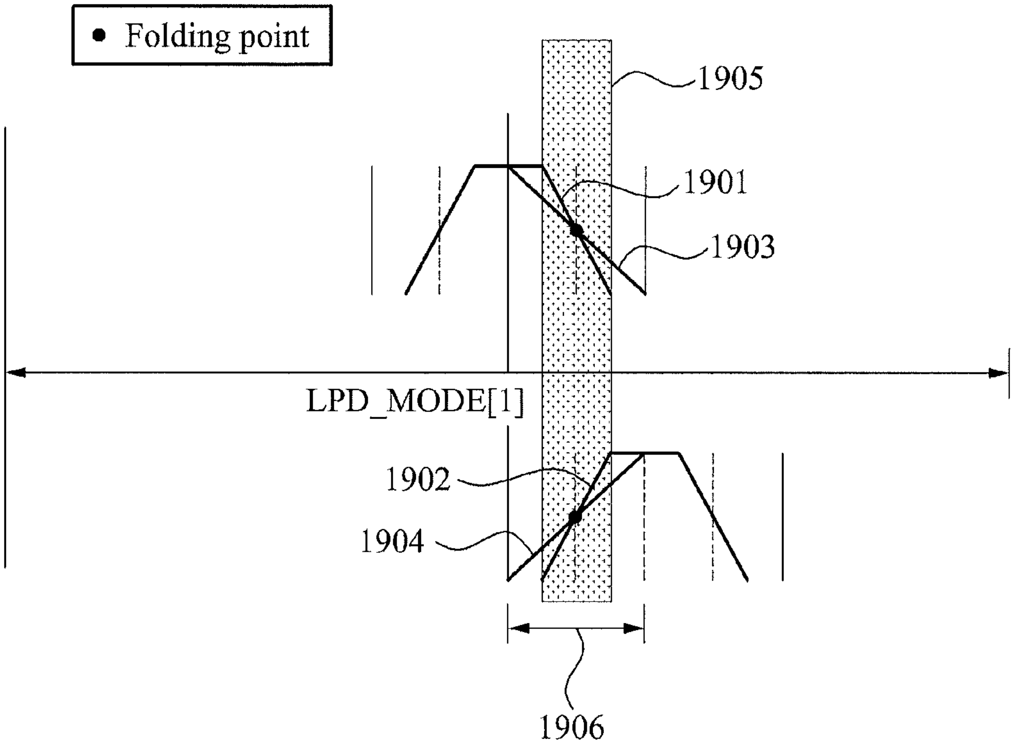
FIG. 19 is a diagram illustrating a window when an LPD mode of 'LPD_SEQUENCE' with respect to a current sub-frame is 1, and when an LPD mode of 'LPD_SEQUENCE' with respect to a next sub-frame is 1 according to an embodiment of the present invention.

FIG. 19 is a diagram illustrating a window when an LPD mode of 'LPD_SEQUENCE' with respect to a current sub-frame is 1, and an LPD mode of 'LPD_SEQUENCE' with respect to a next sub-frame is 1 according to an embodiment of the present invention.

Referring to FIG. 19, when the LPD mode of 'LPD_SEQUENCE' with respect to the next sub-frame is 1, a right window of 'LPD_SEQUENCE' with respect to the current sub-frame may change from a line 1901 to a line 1903. Also, a left window of 'LPD_SEQUENCE' corresponding to the next sub-frame may change from a line 1902 to a line 1904. Accordingly, a region 1905 where window sequences are overlap-added based on a folding point may be extended to a region 1906.

Figure 20:
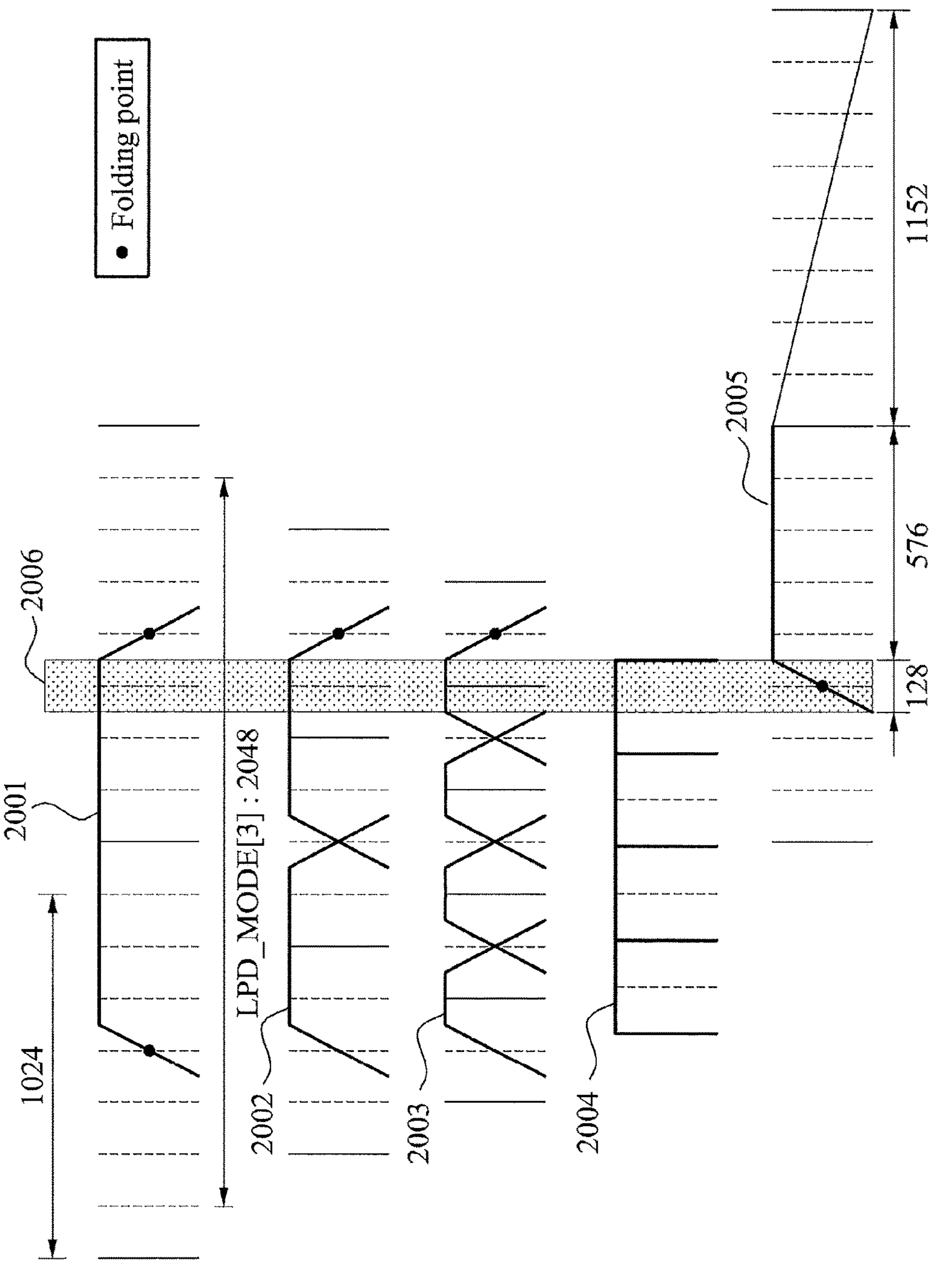
FIG. 20 is a diagram illustrating a window sequence processing method with respect to CASE 4 in a conventional art.

FIG. 20 is a diagram illustrating a window sequence processing method with respect to CASE 4 in a conventional art.

Referring to FIG. 20, each 'LPD_SEQUENCE' 2001, 2002, 2003, and 2004 may be overlapped a window sequence 2005 of an AAC MODE with respect to a region where a TDA is not generated at a region 2006. Each 'LPD_SEQUENCE' 2001, 2002, 2003, and 2004 may be generated an artificial TDA in the region 2006, and may be added to the window sequence 2005.

Figure 21:
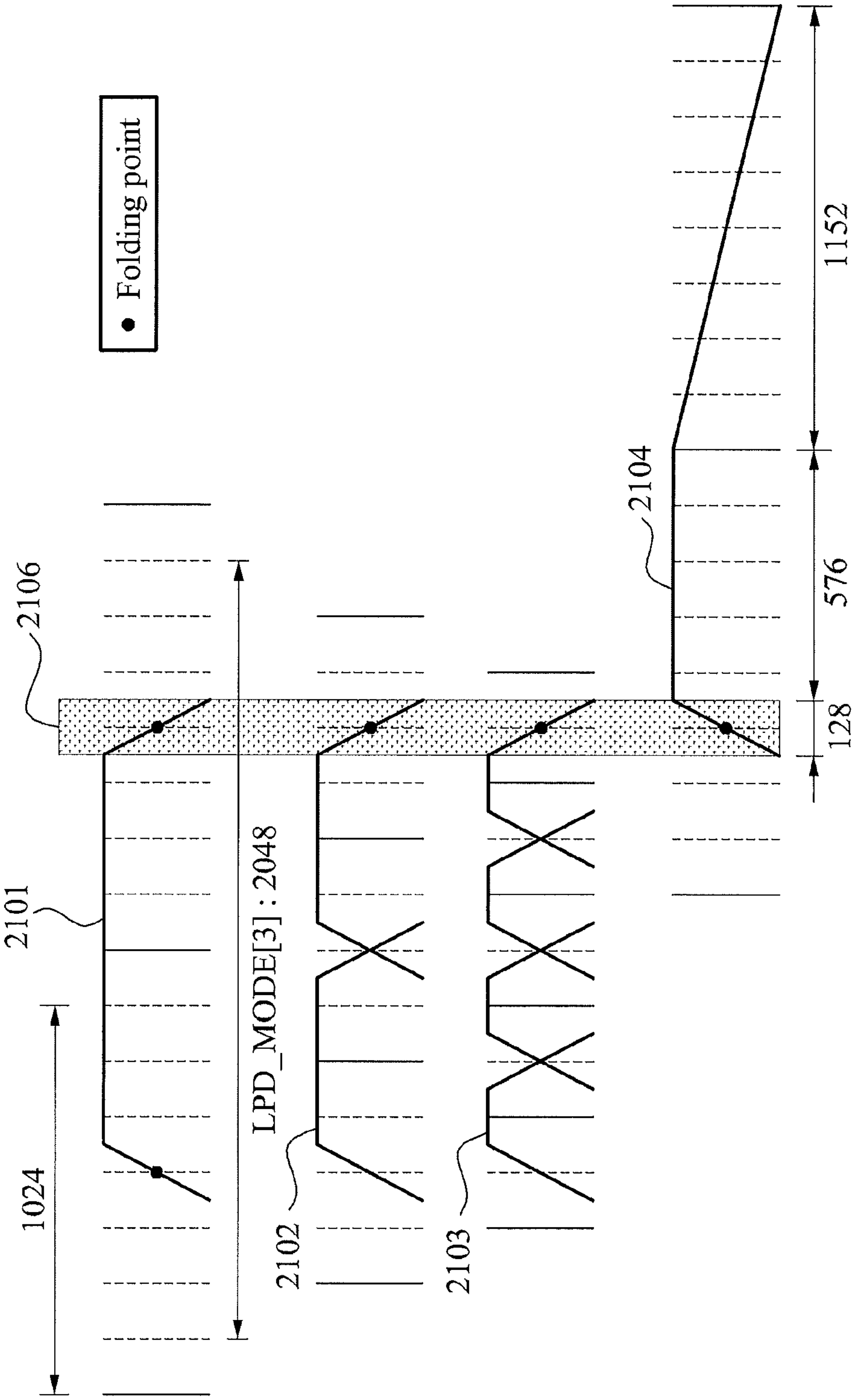
FIG. 21 is a diagram illustrating a first example of a window sequence processing method with respect to CASE 4 according to an embodiment of the present invention.

FIG. 21 is a diagram illustrating a first example of a window sequence processing method with respect to CASE 4 according to an embodiment of the present invention.

FIG. 21 illustrates a window sequence processed by a Blockswitching-1 when the Mode switch-1 of FIG. 1 perform mode switching from an LPD mode to a FD mode like CASE 4. As illustrated in FIG. 21, the Blockswitching-1 may perform overlap-add with respect to a window sequence 2104 and each 'LPD_SEQUENCE' 2101, 2102, and 2103, based on a folding point in a region 2106 where a TDA is generated. Accordingly, an aliasing may be canceled. Here, the window sequence 2104 may correspond to a FD mode, and each 'LPD_SEQUENCE' 2101, 2102, and 2103 may correspond to an LPD mode.

Figure 22:
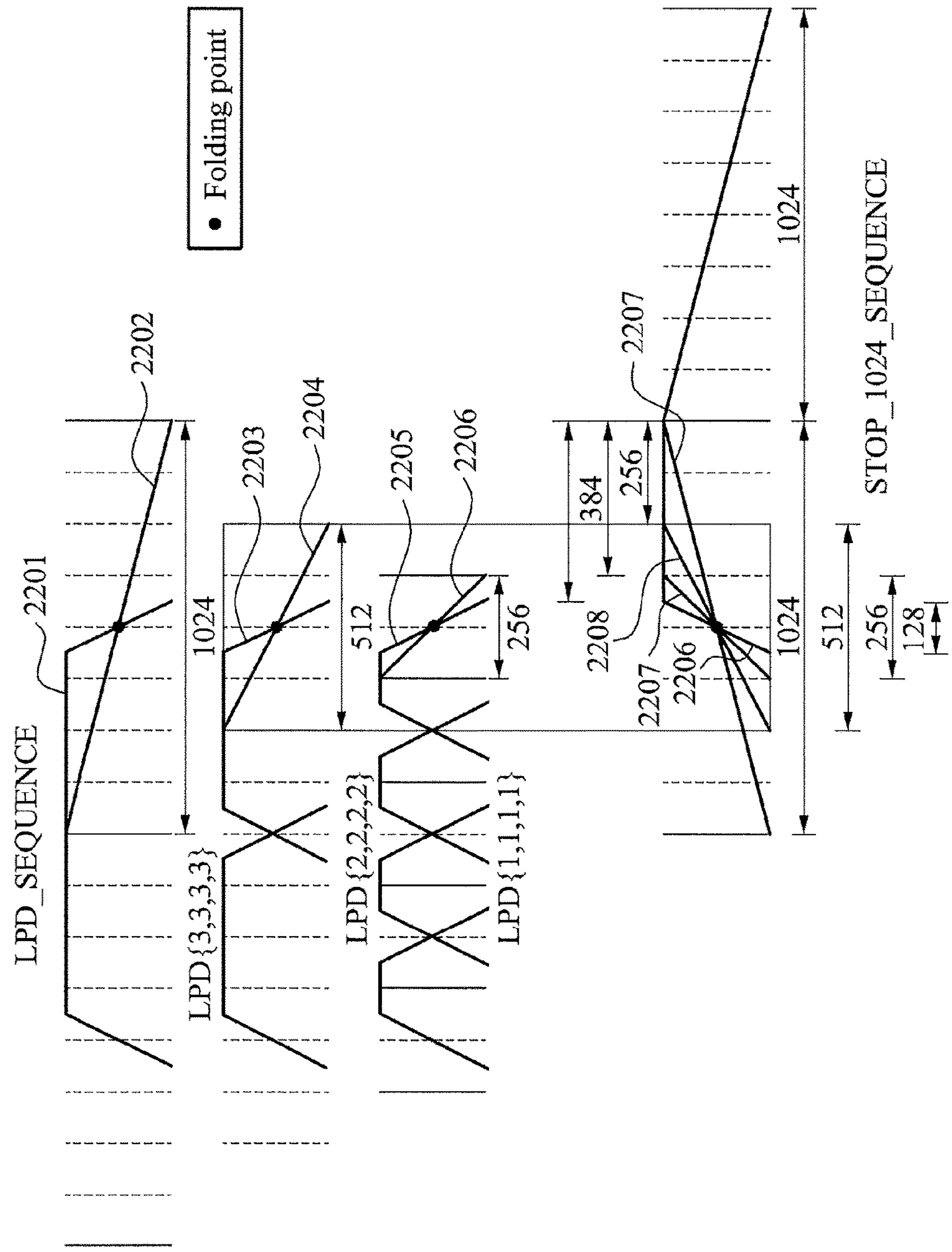
FIG. 22 is a diagram illustrating a second example of a window sequence processing method with respect to CASE 4 according to an embodiment of the present invention.

FIG. 22 is a diagram illustrating a second example of a window sequence processing method with respect to CASE 4 according to an embodiment of the present invention.

Referring to FIG. 22, a left window of 'STOP_1024_SEQUENCE' corresponding to a current frame may change based on an LPD mode of 'LPD_SEQUENCE' of a previous frame. For example, when the LPD mode of 'LPD_SEQUENCE' of the previous frame is {3, 3, 3, 3}, a left window of 'STOP_1024_SEQUENCE' corresponding to the current frame may be changed to a line 2208. Also, when the LPD mode of 'LPD_SEQUENCE' of the previous frame is {1, 1, 1, 1}, the left window of 'STOP_1024_SEQUENCE' corresponding to the current frame may be changed to a line 2209. A line 2210 may indicate a left window of 'STOP_1024_SEQUENCE' of FIG. 21.

Subsequently, since the left window of 'STOP_1024_SEQUENCE' changes, a right window of 'LPD_SEQUENCE' may change. That is, when the left window of 'STOP_1024_SEQUENCE' is changed to a line 2207, the right window of 'LPD_SEQUENCE' may change from a line 2201 to a line 2202. Also, when the left window of 'STOP_1024_SEQUENCE' is changed to a line 2208, the right window of 'LPD_SEQUENCE' may change from a line 2203 to a line 2204. Also, when the left window of 'STOP_1024_SEQUENCE' is changed to a line 2209, the right window of 'LPD_SEQUENCE' may change from a line 2205 to a line 2206.

Accordingly, the changed 'LPD_SEQUENCE' and the changed 'STOP_1024_SEQUENCE' may be overlap-added based on a folding point.

Figure 23:
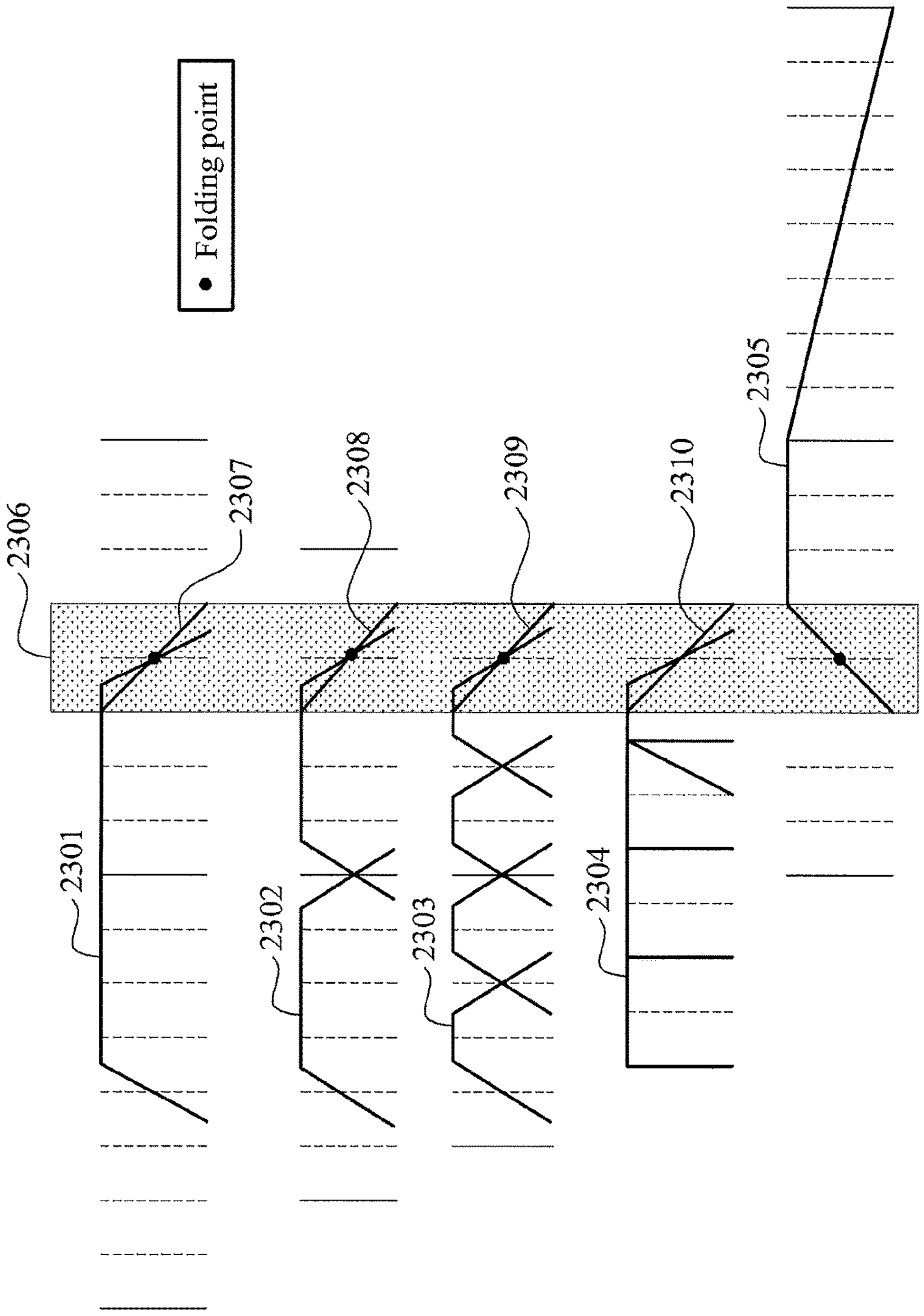
FIG. 23 is a diagram illustrating a third example of a window sequence processing method with respect to CASE 4 according to an embodiment of the present invention.

FIG. 23 is a diagram illustrating a third example of a window sequence processing method with respect to CASE 4 according to an embodiment of the present invention.

In FIG. 23, a window sequence corresponding to a FD mode may be 'STOP_1024_SEQUENCE' 2305. Referring to FIG. 23, a right window of each 'LPD_SEQUENCE' 2301, 2302, 2303, and 2304 may change a line 2307, 2308, 2309, and 2310, respectively. The Mode switching-1 of FIG. 1 may perform overlap-add between each 'LPD_SEQUENCE' 2301, 2302, 2303, and 2304 and 'STOP_1024_SEQUENCE' 2305 in a region 2306 corresponding to 256 points. When an LPD mode of a last sub-frame of 'LPD_SEQUENCE' 2304 is '0', the LPD mode of the final sub-frame may be changed to '1'.

As illustrated in FIG. 23, each 'LPD_SEQUENCE' 2301, 2302, 2303, and 2304 and 'STOP_1024_SEQUENCE' 2305 may be overlap-added based on a folding point. Also, a block size to process 'STOP_1024_SEQUENCE' 2305 corresponding to a FD mode may be 2048 as opposed to 2304.

Referring to FIGS. 22 and 23, a block size of a window sequence of the FD mode may be changed to perform a 2048-MDCT transform. Here, the window sequence may be connected to 'LPD_SEQUENCE'. Accordingly, as illustrated in FIG. 20, the window sequence of the FD mode may not be required to perform a 2034-MDCT transform. According to an embodiment of the present invention, although an LPD mode is changed to the FD mode, a window sequence having a size of 2304 such as 'STOP_1152_SEQUENCE' and 'STOP_START_WINDOW_1152', illustrated in FIG. 3, may not be required. Accordingly, since a window sequence having a different block size is not required when mode switching occurs, an encoding efficiency may be improved.

Thus, the window sequence processing method according to an embodiment of the present invention with respect to CASE 4 is as follows:

(1) a window sequence of a FD mode and a window sequence 'LPD_SEQUENCE' of an LPD mode may be overlap-added based on an MDCT folding point.

(2) a window sequence, connected to 'LPD_SEQUENCE', of a FD mode may be changed based on an LPD mode of a final window of 'LPD_SEQUENCE'.

(3) a block size of the window sequence connected to 'LPD_SEQUENCE', that is, an MDCT transform size, may be 2048, and a block having a size of 2304 may not be required.

The USAC(decoding) according to an embodiment of the present invention may obtain an output signal where an aliasing is canceled by simply applying a window sequence, which is applied to the USAC(encoding), to overlap-add.

Figure 24:
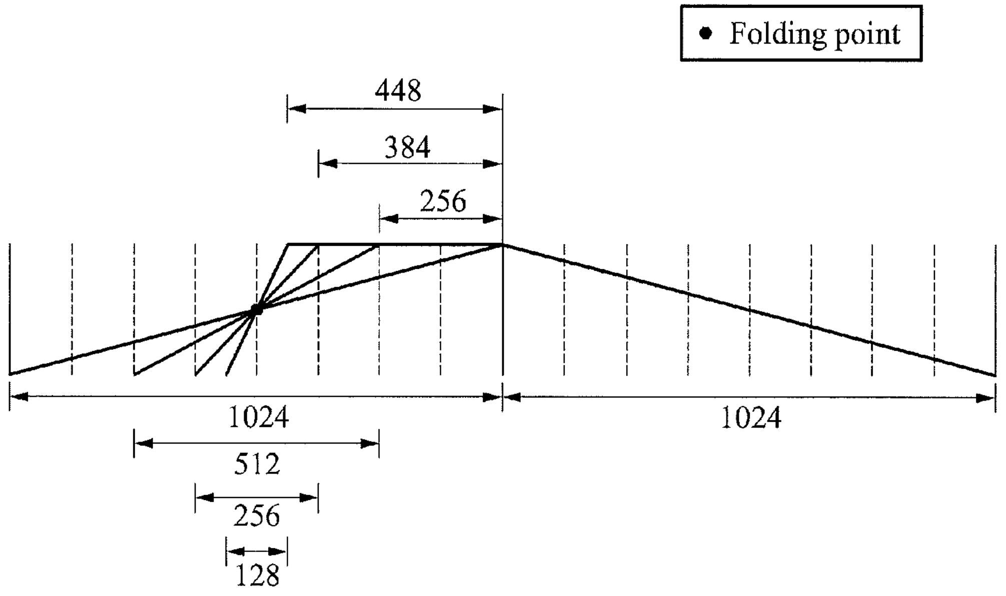
FIG. 24 is a diagram illustrating 'STOP_1024_SEQUENCE' where the window sequence of FIG. 22 is applied according to an embodiment of the present invention.

FIG. 24 is a diagram illustrating 'STOP_1024_SEQUENCE' where the window sequence of FIG. 22 is applied according to an embodiment of the present invention.

Referring to FIG. 24, a left window of a window sequence of an AAC MODE of a previous frame may be changed to each line 2401, 2402, and 2403. A line 2404 may be associated with a window sequence 2205 of the AAC MODE.

According to an embodiment of the present invention, since an MDCT coefficient is 1024, the window sequence of FIG. 24 may be defined as 'STOP_1024_SEQUENCE'. Conversely, since a block size of the window sequence, defined in the RM of FIG. 3, is 2304, and an MDCT coefficient is 1152, the window sequence of FIG. 3 may be defined as 'STOP_1152_SEQUENCE'.

Figure 25:
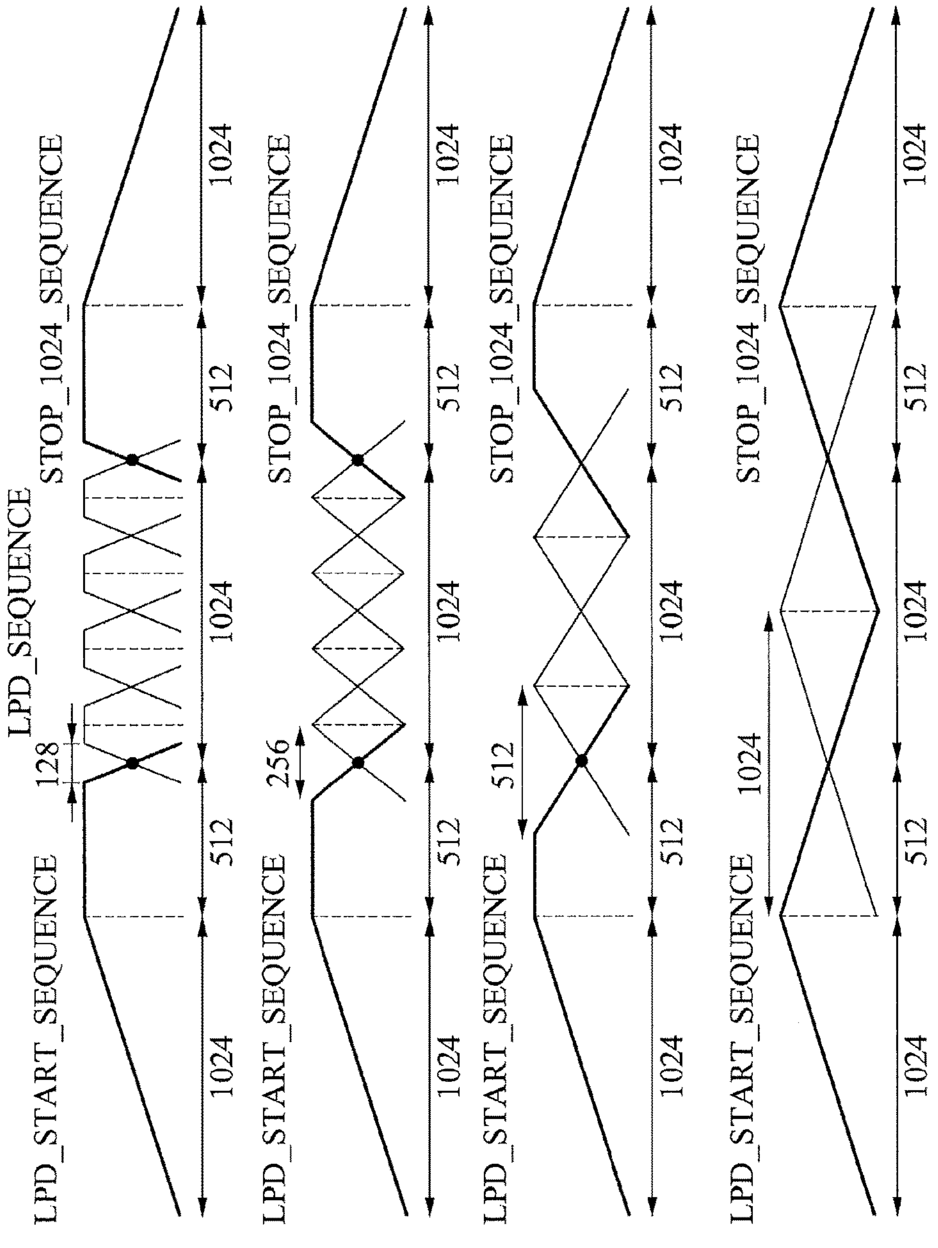
FIG. 25 is a diagram illustrating results where the window sequences of FIG. 16 and FIG. 24 are applied according to an embodiment of the present invention.

FIG. 25 is a diagram illustrating results where the window sequences of FIG. 16 and FIG. 24 are applied according to an embodiment of the present invention.

FIG. 25 illustrates 'LPD_START_SEQUENCE', 'LPD_SEQUENCE', and 'STOP_1024_SEQUENCE'. That is, the window sequences illustrated in FIG. 25 may be window sequences processed when the Mode switch-1 performs mode switching a FD mode 4 LPD mode→FD mode.

Referring to FIG. 25, a shape of a right window of 'LPD_START_SEQUENCE' and a shape of a left window of 'STOP_1024_SEQUENCE' may be changed based on 'LPD_SEQUENCE'. Also, a size of a region which is overlap-added to each of 'LPD_START_SEQUENCE' and 'STOP_1024_SEQUENCE' may be changed based on 'LPD_SEQUENCE'.

Figure 26:
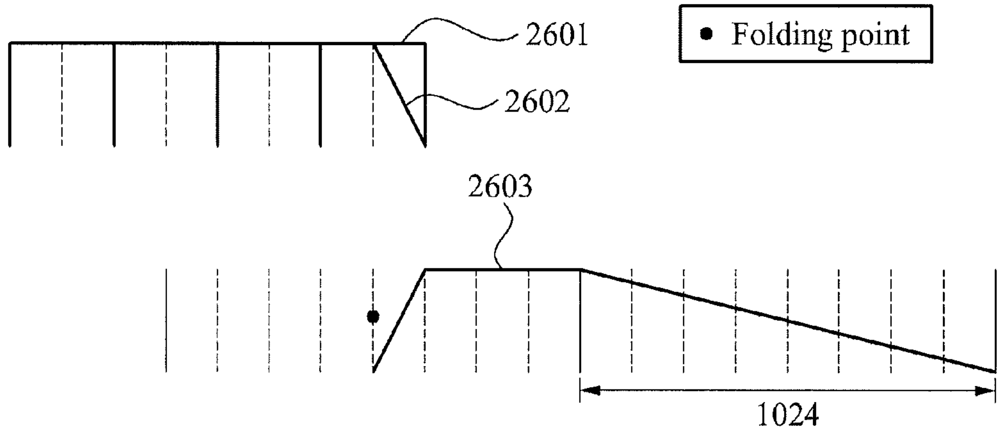
FIG. 26 is a diagram illustrating a window when an Algebraic Code Excited Linear Prediction (ACELP) is changed to a FD according to an embodiment of the present invention.

FIG. 26 is a diagram illustrating a window when an ACELP is changed to a FD according to an embodiment of the present invention.

When an LPD mode of 'LPD_SEQUENCE' corresponding to a previous frame is {x, x, x, 0}, that is, when an end sub-frame of the previous frame is an ACELP, a window of an end sub-frame of 'LPD_SEQUENCE' may be changed from a line 2601 to a line 2602. Subsequently, a window sequence of a current frame and 'LPD_SEQUENCE' corresponding to the previous frame, illustrated in FIG. 26, are overlap-added and cross-folded. Here, the window sequence where the LPD mode is {x, x, x, 0} may be processed by only USAC(decoding), since an ACELP signal is a time domain signal without TDA.

Figure 27:
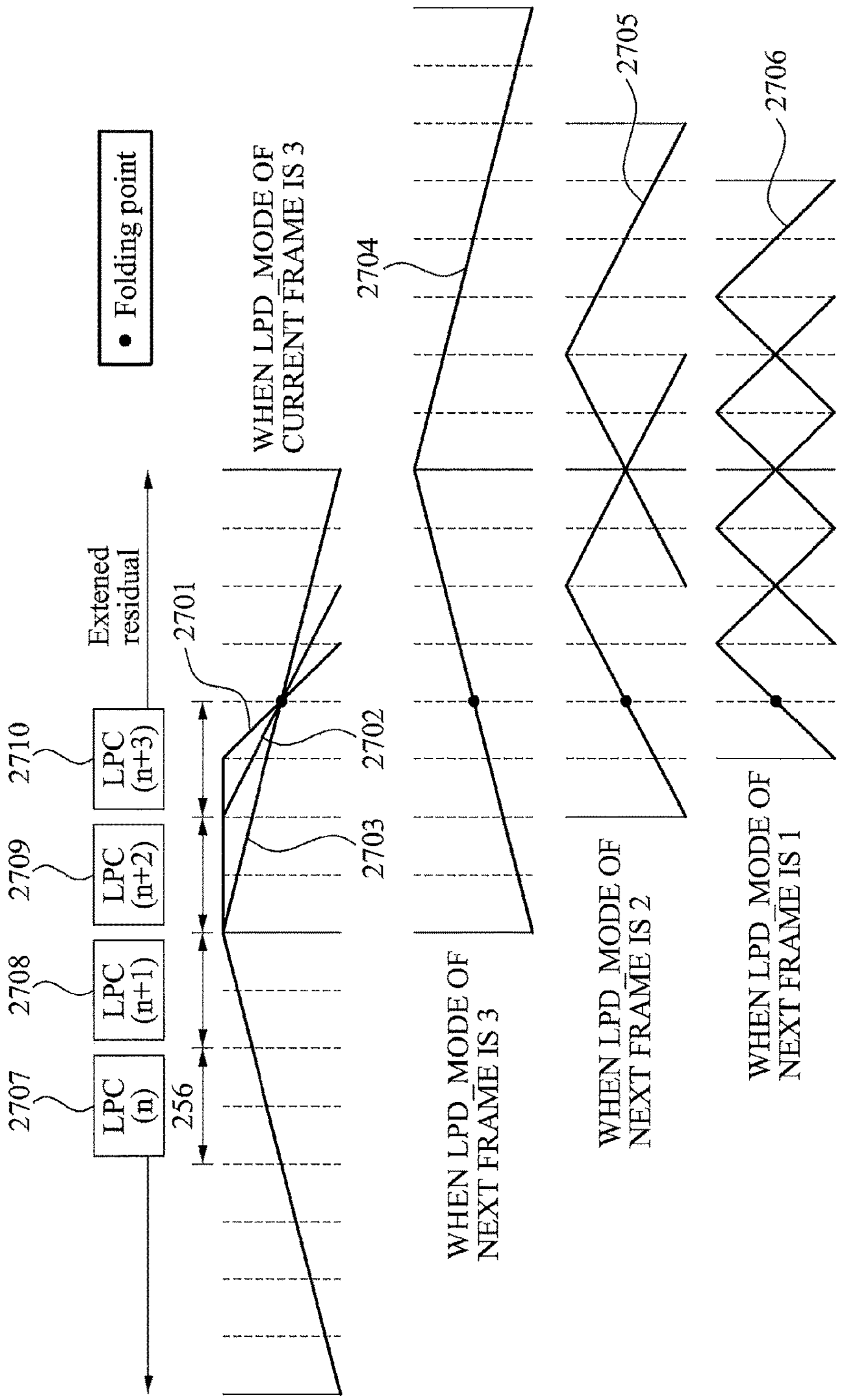
FIG. 27 is a diagram illustrating a window sequence and a Linear Prediction Coefficient (LPC) extraction location based on an LPD mode of a current frame and an LPD mode of a next frame according to an embodiment of the present invention.

FIG. 27 is a diagram illustrating a window sequence and an LPC extraction location based on an LPD mode of a current frame and an LPD mode of a next frame according to an embodiment of the present invention.

A right window of 'LPD_SEQUENCE' of a current frame may be changed based on an LPD mode of 'LPD_SEQUENCE' 2702, 2703, and 2704 of a next frame. In FIG. 27, the LPD mode of 'LPD_SEQUENCE' of the current frame may be {3, 3, 3, 3}.

As illustrated in FIG. 27, when 'LPD_SEQUENCE' 2704 where an LPD mode of the next frame is {3, 3, 3, 3} is connected, a right window of 'LPD_SEQUENCE' of the current frame may be changed to the line 2703. Also, when 'LPD_SEQUENCE' 2705 where an LPD mode of the next frame is {2, 2, 2, 2} is connected, the right window of 'LPD_SEQUENCE' of the current frame may be changed to the line 2702. Also, when 'LPD_SEQUENCE' 2706 where an LPD mode of the next frame is {1, 1, 1, 1} is connected, the right window of 'LPD_SEQUENCE' of the current frame may be changed to a line 2701.

That is, when mode switching occurs from an LPD mode to another LPD mode, 'LPD_SEQUENCE' of the current frame may be changed based on an LPD mode of 'LPD_SEQUENCE' of the next frame. Accordingly, the changed 'LPD_SEQUENCE' in the current frame may be overlap-added to 'LPD_SEQUENCE' of the next frame.

In FIG. 27, an LPC may be extracted for each sub-frame of 256 points. According to an embodiment of the present invention, a folding point where window sequences are overlap-added may be located in a boundary of a sub-frame. The LPC may be extracted for each sub-frame of 256 points by setting the folding point as a starting point. An LPC extraction location with respect to 'LPD_SEQUENCE' of the current frame may correspond to each sub-frame 2707, 2708, 2709, and 2710. That is, the LPC may be extracted by matching with a boundary of a sub-frame based on the folding point as the starting point. LPC(n) 2707 and LPC (n+3) 2710 may extract the LPC in a residual region from among entire frames excluding the corresponding sub-frame.

Figure 28:
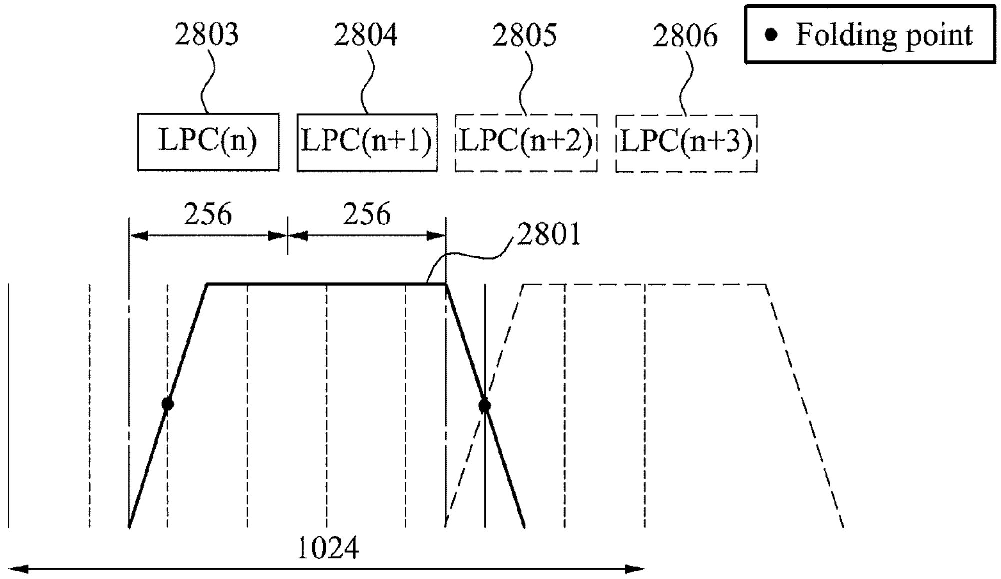
FIG. 28 is a diagram illustrating an LPC extraction location in a conventional art and an LPC extraction location according to an embodiment of the present invention.
Figure 28:
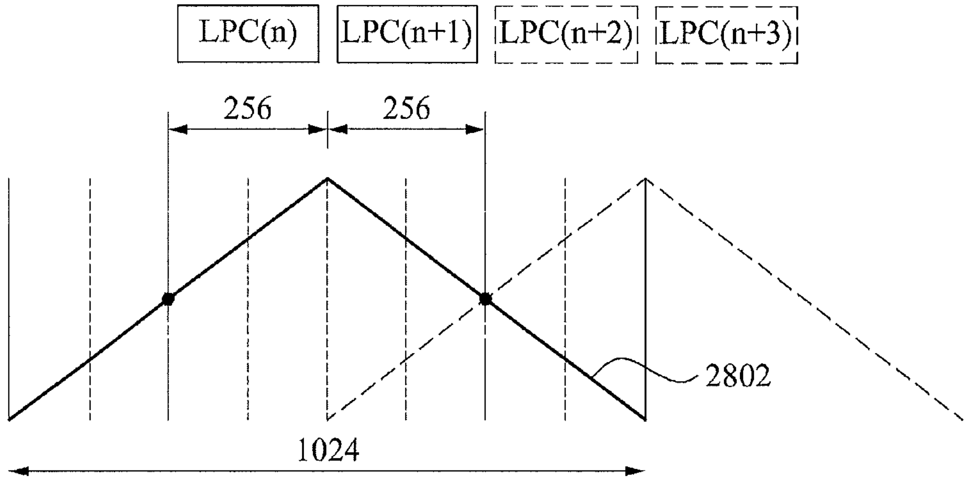

FIG. 28 is a diagram illustrating an LPC extraction location in a conventional art and an LPC extraction location according to an embodiment of the present invention.

FIG. 28 (*a*) illustrates the LPC extraction location in a conventional art, and FIG. 28 (*b*) illustrates the LPC extraction location according to an embodiment of the present invention. Referring to FIG. 28 (*a*), an LPC may be extracted in LPC extraction locations 2803, 2804, 2805, and 2806, which are spaced apart from a boundary of a sub-frame by 64 points, regardless of a folding point. Also, a size of a region where windows are overlap-added may be 128 points in FIG. 28 (*a*).

Referring to FIG. 28 (*b*), an LPC may be extracted in LPC extraction locations 2803, 2804, 2805, and 2806, corresponding to a sub-frame, based on a folding point as a starting point. Here, the folding point may be located in a boundary of the sub-frame. Also, a size of a region where windows are overlap-added may be 256 points in FIG. 28 (*b*). Accordingly, information about additional 64 points may not be required for LPC extraction.

Figure 29:
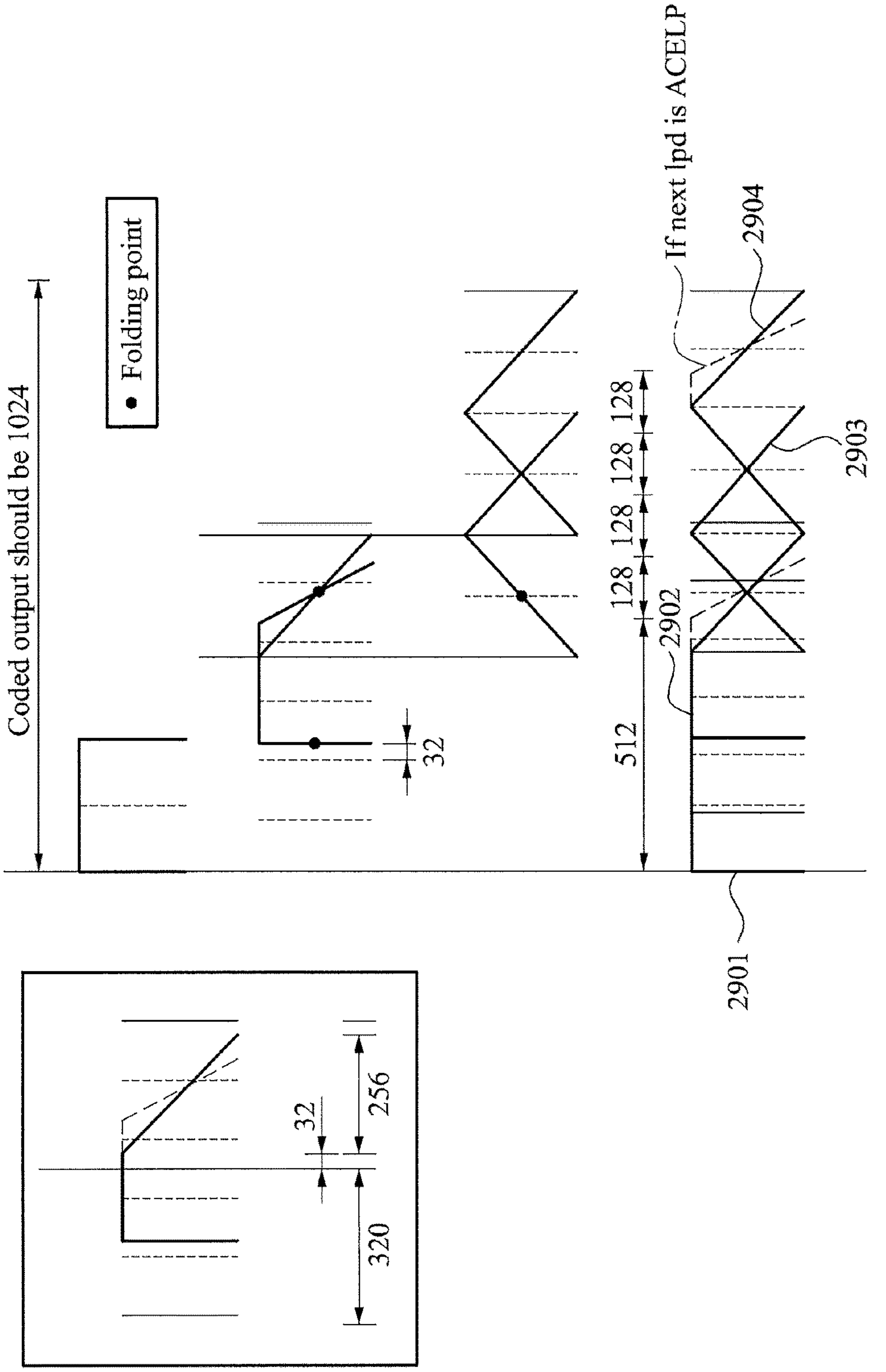
FIG. 29 is a diagram illustrating a window sequence when lpd_mode={1, 0, 1, 1} according to an embodiment of the present invention.

FIG. 29 is a diagram illustrating a window sequence when lpd_mode={1, 0, 1, 1} according to an embodiment of the present invention.

Referring to FIG. 29, when an ACELP mode is applied in a first sub-frame, a window 2901 corresponding to the first sub-frame and a window 2902 corresponding to a second sub-frame may not be overlapped. However, a right portion of the window 2902 may be determined based on an LPD mode of a window 2903 corresponding to a third sub-frame.

When an LPD mode of a window after a final sub-frame is an ACELP mode, that is, lpd_mode=0, the window defined in the RM of FIG. 3 may be applied as a window 2904. Conversely, when the LPD mode of the window after the final sub-frame is not the ACELP mode (lpd_mode=0), a right portion of the window 2904 may be changed to enable the right portion of the window 2904 to be overlapped by 256 points.

Figure 30:
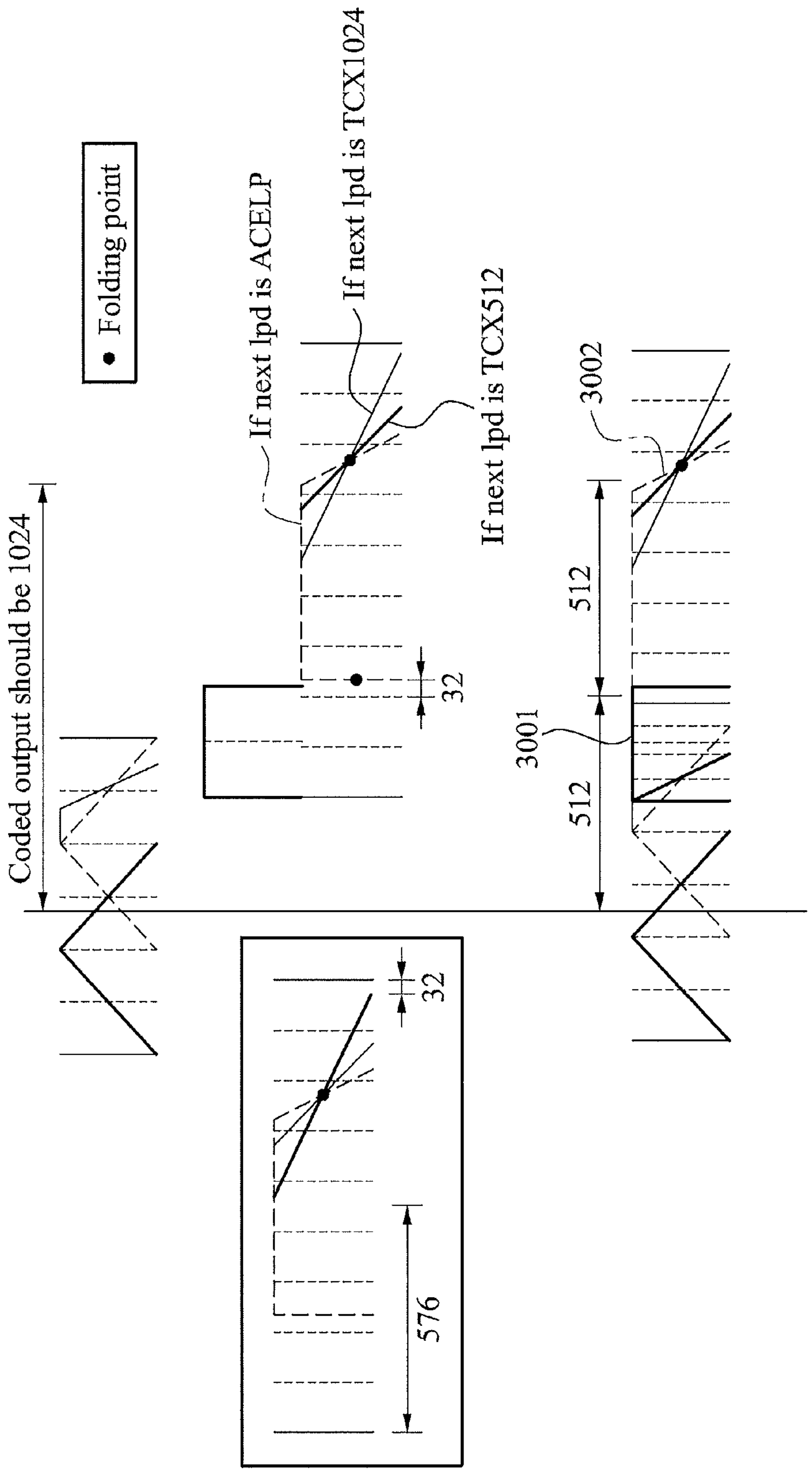
FIG. 30 is a diagram illustrating a window sequence when lpd_mode={1, 0, 2, 2} according to an embodiment of the present invention.

FIG. 30 is a diagram illustrating a window sequence when lpd_mode={1, 0, 2, 2} according to an embodiment of the present invention.

When an ACELP (lpd_mode=0) occurs in a previous sub-frame or a next sub-frame, a type of a connection portion of a window 3002, corresponding to a current sub-frame where lpd_mode=1, lpd_mode=2, or lpd_mode=3, may be the same as Table 1.

Also, when lpd_mode=0 (ACELP) in a window 3001 corresponding to the previous sub-frame, and lpd_mode=1, lpd_mode=2, or lpd_mode=3 in the next sub-frame, a right portion of the window 3002 corresponding to the current sub-frame may be changed based on an LPD mode of the next sub-frame. Also, a left portion of the window 3002 may be changed to a rectangular shape and may not overlap with the window 3001 corresponding to the previous sub-frame.

Figure 31:
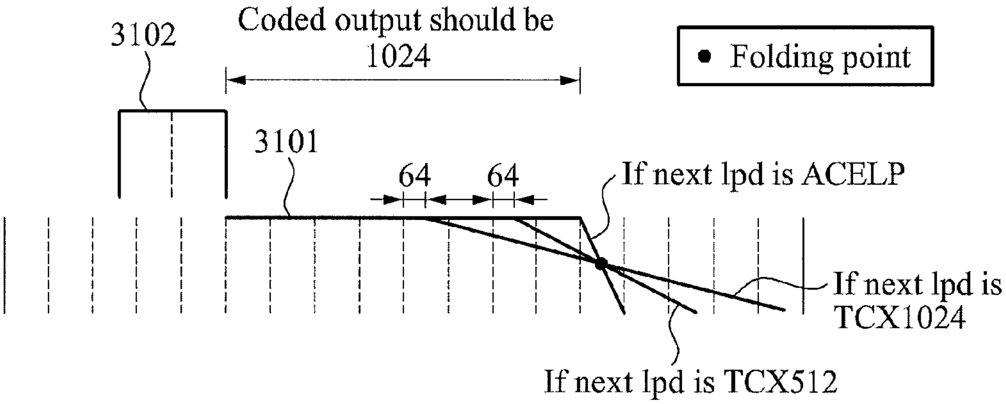
FIG. 31 is a diagram illustrating a window sequence when lpd_mode={3, 3, 3, 3} in a current frame, and lpd_mode={x, x, x, 0} in a previous frame according to an embodiment of the present invention.

FIG. 31 is a diagram illustrating a window sequence when lpd_mode={3, 3, 3, 3} in a current frame, and lpd_mode={x, x, x, 0} in a previous frame according to an embodiment of the present invention.

Similarly to FIG. 29 and FIG. 30, FIG. 31 illustrates a window 3101 corresponding to the current frame, when lpd_mode=0 in a window 3102 corresponding to the previous frame. Here, lpd_mode={3, 3, 3, 3} in the window 3101 corresponding to the current frame. A right portion of the window 3101 may be changed to an LPD mode of a next frame. In FIG. 31, TCX 1024 may indicate lpd_mode=3 in a window corresponding to the next frame, and TCX 512 may indicate lpd_mode=2 in the window corresponding to the next frame. Also, ACELP may indicate lpd_mode=0 in the window corresponding to the next frame.

Figure 32:
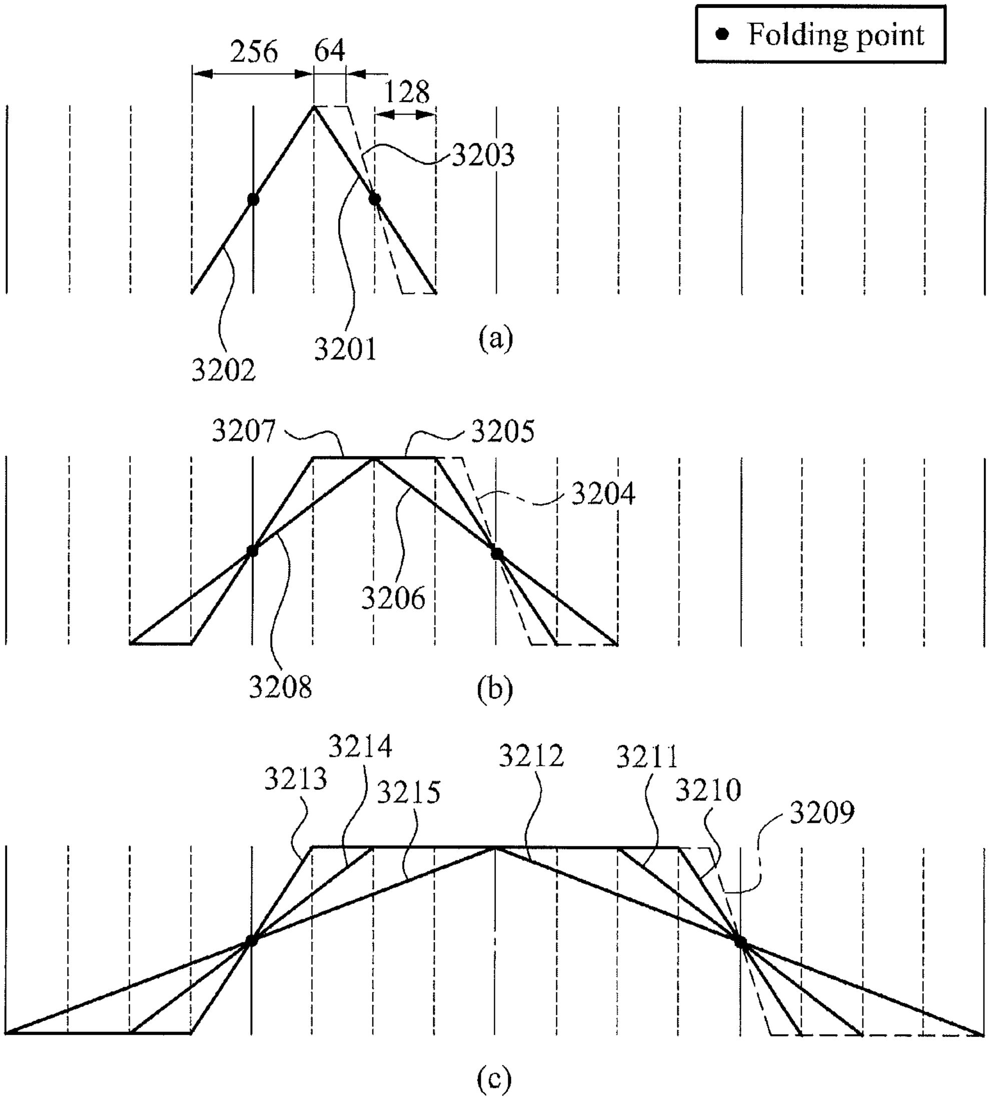
FIG. 32 is a diagram illustrating window sequences based on lpd_mode=0 (ACELP) of a previous sub-frame and a next sub-frame, (a) when lpd_mode=1 (TCX 256), (b) when lpd_mode=2 (TCX 512), and (c) when lpd_mode=3 (TCX 1024)

FIG. 32 is a diagram illustrating window sequences based on lpd_mode=0 (ACELP) of a previous sub-frame and a next sub-frame, (a) when lpd_mode=1 (TCX 256) (a), (b) when lpd_mode=2 (TCX 512), and (c) when lpd_mode=3 (TCX 1024).

Referring to FIG. 32 (*a*), when lpd_mode=1 (TCX 256) in a current frame and a window corresponding to the next frame is ACELP, a right portion of a window corresponding to the current frame may be a line 3203. When lpd_mode=1 in the previous frame and lpd_mode=1 in the window corresponding to the next frame, a left portion of the window corresponding to the current frame may be a line 3202, and a right portion of the window corresponding to the current frame may be a line 3201. However, when lpd_mode=0 (ACELP) in the previous frame, the window corresponding to the current frame may have a same shape as the window 2902 in FIG. 29.

In this instance, as illustrated in FIG. 29, when lpd_mode=1 in a next window, a right portion of the window 2902 may be represented in solid line. When lpd_mode=0 in the next window, the right portion of the window 2902 may be represented in dotted line.

Referring to FIG. 32 (*b*), when lpd_mode=2 (TCX 512) in a current frame and a window corresponding to the next frame is ACELP, a right portion of a window corresponding to the current frame may be a line 3204. When lpd_mode=1 in the previous frame, a left portion of the window corresponding to the current frame may be a line 3207. Also, when lpd_mode=1 in the next frame, a right portion of the window corresponding to the current frame may be a line 3205.

When lpd_mode=2 in the previous frame, the left portion of the window corresponding to the current frame may be a line 3208. Also, when lpd_mode=2 in the next frame, the right portion of the window corresponding to the current frame may be a line 3206.

However, when lpd_mode=0 (ACELP) in the previous frame, the window corresponding to the current frame may have a same shape as the window 3002 in FIG. 30. In this instance, as illustrated in FIG. 30, a right portion of the window 3002 may be changed based on an LPD mode of a next frame.

Also, when an LPD mode of the current frame is 1 or 2, and the LPD mode of the next frame is greater than the LPD mode of the current frame, a window corresponding to the current frame may be changed to match the LPD mode of the next frame.

For example, when the LPD mode of the current frame is 1 and the LPD mode of the next frame is 2, a right portion of the window corresponding to the current frame may be a line 3201 in FIG. 32. Also, when the LPD mode of the current frame is 2 and the LPD mode of the next frame is 3, a right portion of the window corresponding to the current frame may be the line 3204 in FIG. 32.

Referring to FIG. 32 (*c*), when lpd_mode=3 (TCX 1024) in a current frame and a window corresponding to the next frame is ACELP, a right portion of a window corresponding to the current frame may be a line 3209. When lpd_mode=1 in the previous frame, a left portion of the window corresponding to the current frame may be a line 3213. Also, when lpd_mode=1 in the next frame, a right portion of the window corresponding to the current frame may be a line 3210.

When lpd_mode=2 in the previous frame, the left portion of the window corresponding to the current frame may be a line 3214. Also, when lpd_mode=2 in the next frame, the right portion of the window corresponding to the current frame may be a line 3211.

When lpd_mode=3 in the previous frame, the left portion of the window corresponding to the current frame may be a line 3215. Also, when lpd_mode=3 in the next frame, the right portion of the window corresponding to the current frame may be a line 3212.

However, when lpd_mode=0 (ACELP) in the previous frame, the window corresponding to the current frame may have a same shape as the window 3101 in FIG. 31. In this instance, as illustrated in FIG. 31, a right portion of the window 3101 may be changed based on an LPD mode of a next frame.

Accordingly, in the window corresponding to the current frame in FIG. 32, a left portion of the window may be changed based on an LPD mode of the previous frame, and a right portion may be changed based on an LPD mode of the next frame.

Figure 33:
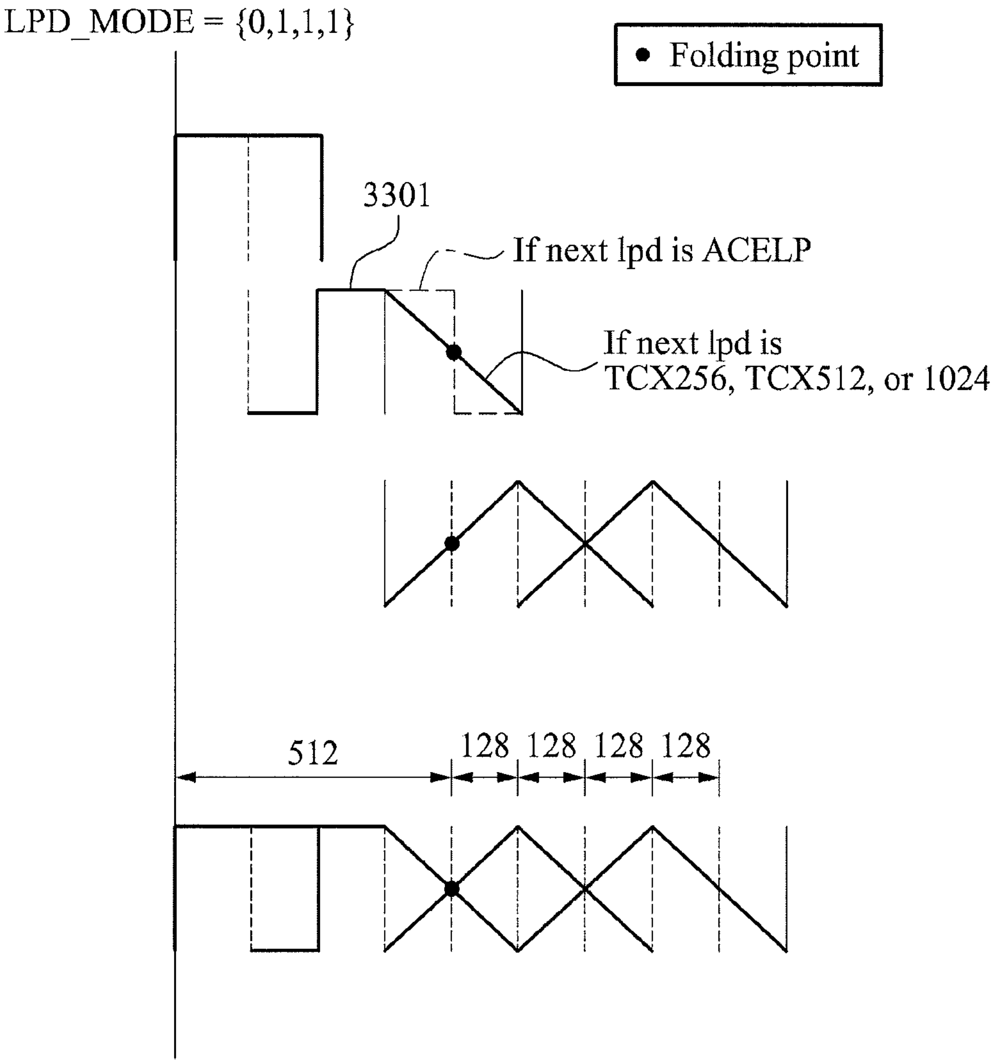
FIG. 33 is a diagram illustrating a window sequence when an LPD mode of a current sub-frame is 1 (TCX 256) and an LPD mode of a previous sub-frame is 0 according to an embodiment of the present invention.

FIG. 33 is a diagram illustrating a window sequence when an LPD mode of a current sub-frame is 1 (TCX 256) and an LPD mode of a previous sub-frame is 0 according to an embodiment of the present invention.

Referring to FIG. 33, although a previous frame and a next frame of a current frame is an ACELP mode, only shape of a window of the current frame may change. For example, when lpd_mode=1 (TCX 256) in the current frame, and the previous frame is in the ACELP mode, a left portion of a window 3301 corresponding to the current frame may be a rectangular shape, and a right portion of the window 3301 may be changed based on an LPD mode (TCX 256, TCX 512, and TCX 1024) of the next frame.

Figure 34:
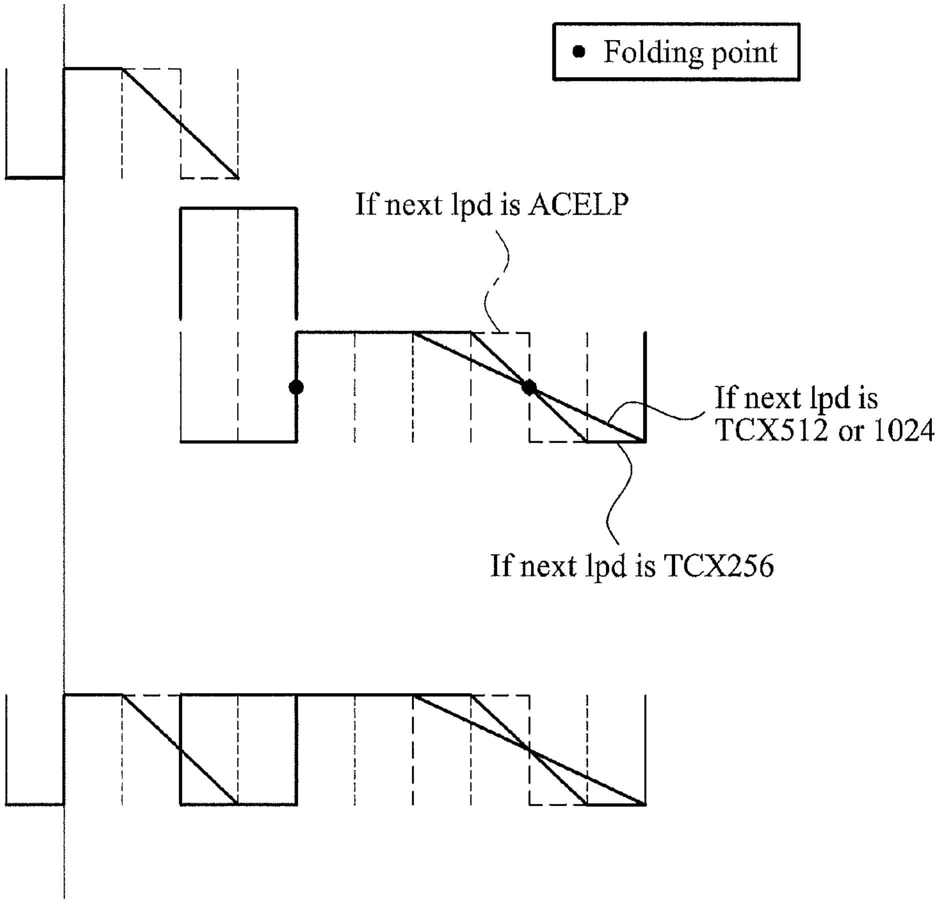
FIG. 34 is a diagram illustrating a window sequence when an LPD mode of a current sub-frame is 2 (TCX 512) and an LPD mode of a previous sub-frame is 0 according to an embodiment of the present invention.

FIG. 34 is a diagram illustrating a window sequence when an LPD mode of a current sub-frame is 2 (TCX 512) and an LPD mode of a previous sub-frame is 0 according to an embodiment of the present invention.

Referring to FIG. 34, although a previous frame and a next frame of a current frame is an ACELP mode, only shape of a window of the current frame may change. For example, when lpd_mode=2 (TCX 512) in the current frame, and the previous frame is in the ACELP mode, a left portion of a window 3401 corresponding to the current frame may be a rectangular shape, and a right portion of the window 3401 may be changed based on an LPD mode (TCX 512 and TCX 1024) of the next frame.

Figure 35:
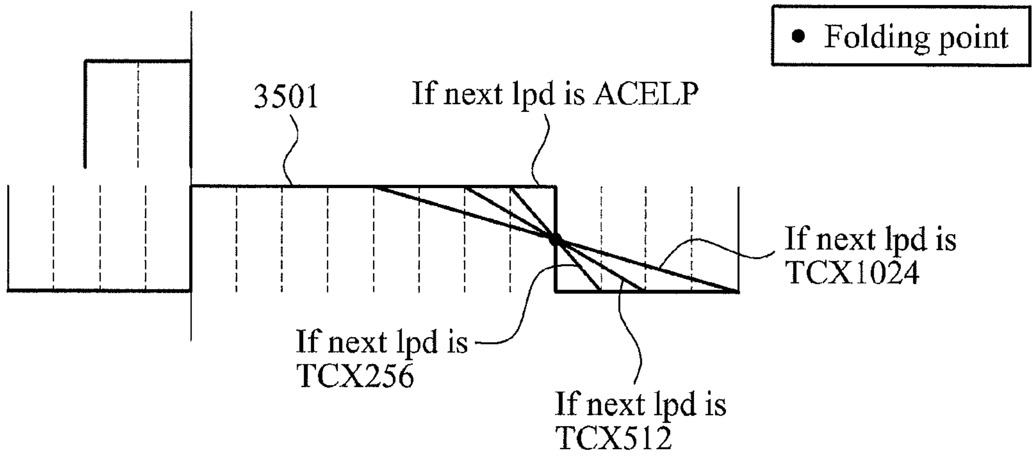
FIG. 35 is a diagram illustrating a window sequence when an LPD mode of a current sub-frame is 3 (TCX 1024) and an LPD mode of a previous sub-frame is 0 according to an embodiment of the present invention.

FIG. 35 is a diagram illustrating a window sequence when an LPD mode of a current sub-frame is 3 (TCX 1024) and an LPD mode of a previous sub-frame is 0 according to an embodiment of the present invention.

Referring to FIG. 35, although a previous frame and a next frame of a current frame is an ACELP mode, only shape of a window of the current frame may change. For example, when lpd_mode=3 (TCX 1024) in the current frame, and the previous frame is in the ACELP mode, a left portion of a window 3501 corresponding to the current frame may be a rectangular shape, and a right portion of the window 3501 may be changed based on an LPD mode (TCX 256, TCX 512, and TCX 1024) of the next frame.

Figure 36:
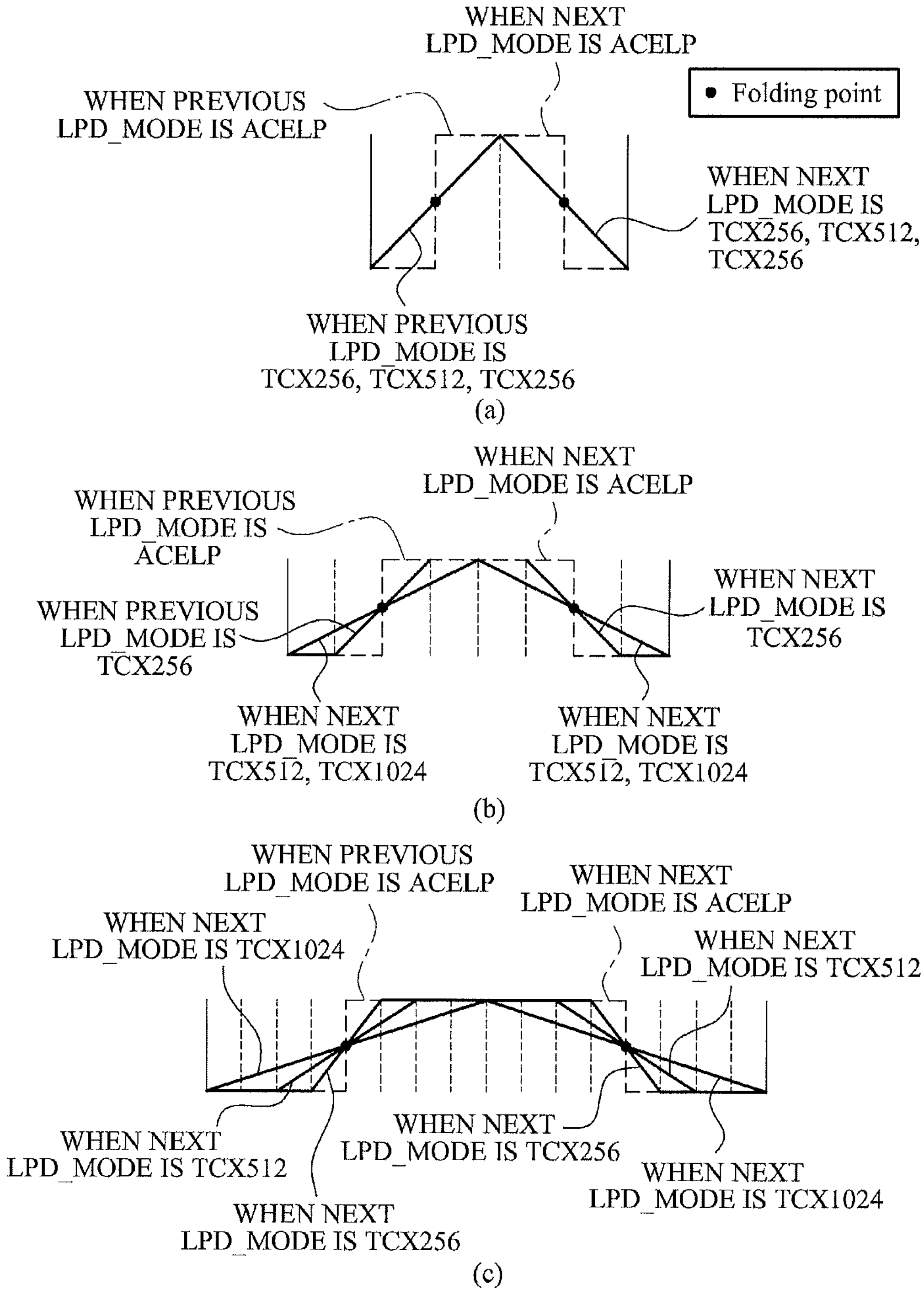
FIG. 36 is a diagram illustrating results where the window sequences of FIGS. 33 through 35 are combined.

FIG. 36 is a diagram illustrating results where the window sequences of FIGS. 33 through 35 are combined.

FIG. 36 (*a*) may be associated with when an LPD mode of the current frame is 1. FIG. 36 (*b*) may be associated with when an LPD mode of the current frame is 2. FIG. 36 (*c*) may be associated with when an LPD mode of the current frame is 3. In this instance, FIG. 36 may be associated with when a left portion of a window corresponding to the current frame is determined based on an LPD mode of a previous frame, and when a right portion of the window corresponding to the current frame is determined based on an LPD mode of a next frame.

Figure 37:
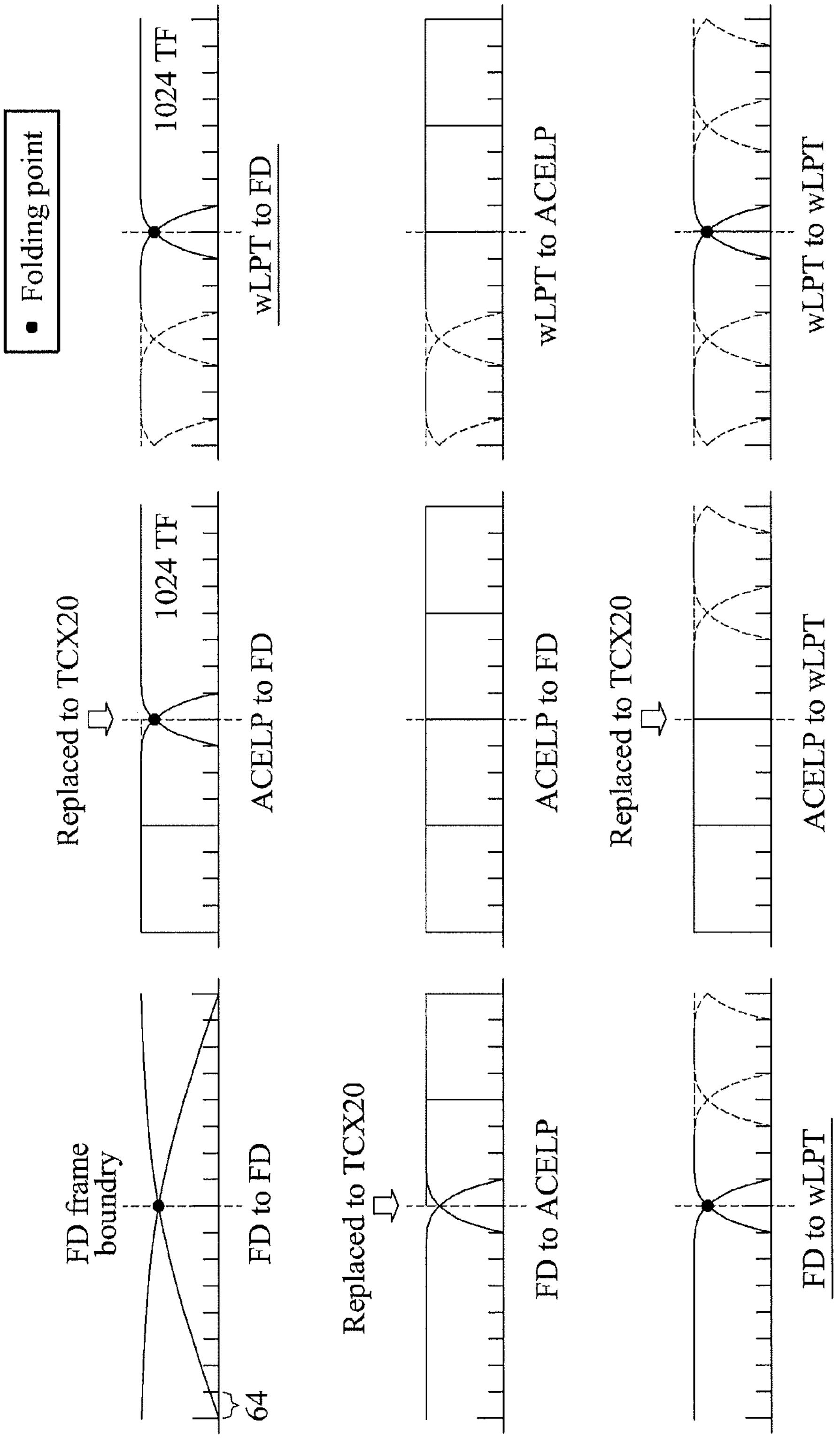
FIG. 37 is a diagram illustrating a window sequence when mode switching occurs according to an embodiment of the present invention.

FIG. 37 is a diagram illustrating a window sequence when mode switching occurs according to an embodiment of the present invention.

The Mode switch-1 of FIG. 1 may perform mode switching between FD modes, from an LPD mode to a FD mode, and from a FD mode to an LPD mode, based on a frame of an input signal. The Mode switch-2 may perform mode switching between LPD modes based on a sub-frame of an input signal. In this instance, when an LPD mode is '0', the LPD mode may be an ACELP. When the LPD mode is not '0', the LPD mode may be a wLPT or TCX.

FIG. 37 illustrates a window sequence processed by the Blockswitching-1 and the Blockswitching-2 when mode switching occurs in the Mode switch-1 and the Mode switch-2. Referring to FIG. 37, a folding point may be located in a boundary of a sub-frame and a size of the frame may be 1024. An size of 128 points in a region where windows are overlapped is illustrated in FIG. 37 for a simple description of the present invention.

Figure 38:
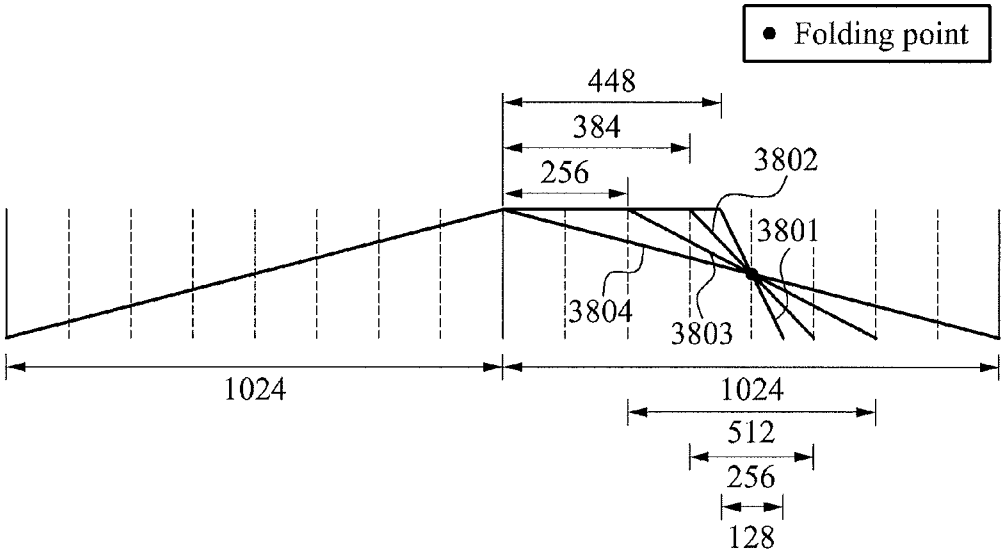
FIG. 38 is a diagram illustrating a result of change of 'LPD_START_SEQUENCE' and 'STOP_1152_SEQUENCE' of FIG. 3 according to an embodiment of the present invention.
Figure 38:
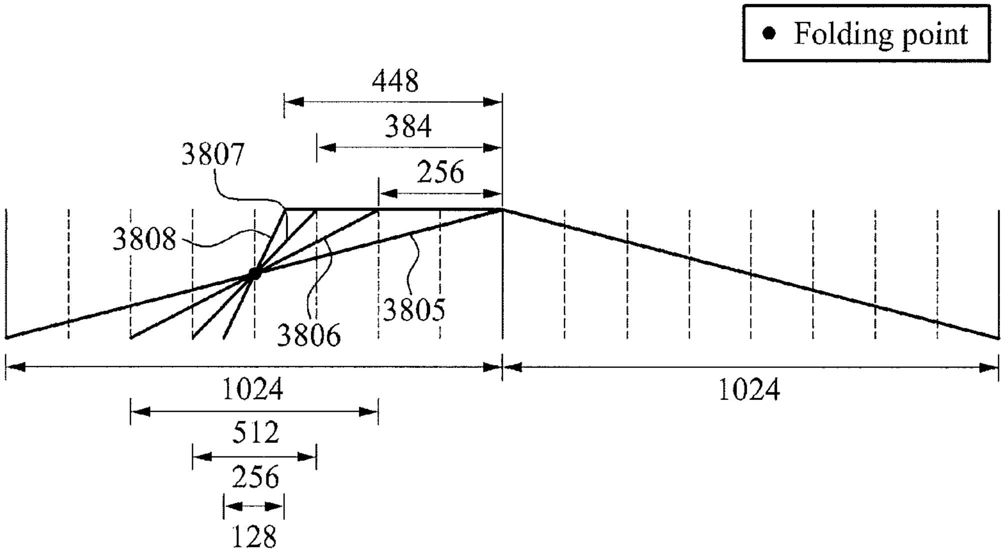

FIG. 38 is a diagram illustrating a result of change of 'LPD_START_SEQUENCE' and 'STOP_1152_SEQUENCE' of FIG. 3 according to an embodiment of the present invention.

FIG. 38 (*a*) illustrates the change of 'LPD_START_SEQUENCE' of FIG. 3, and a size of MDCT may be 1024. 'LPD_START_SEQUENCE' of FIG. 38 (*a*) may be identical to FIG. 16, and a right portion of 'LPD_START_SEQUENCE' may be changed to each line 3802, 3803, and 3804 based on an LPD mode of 'LPD_SEQUENCE' of a next frame. A line 3801 may indicate that an interval of a region, overlapping with 'LPD_SEQUENCE', is 128 points, which is identical to a window sequence associated with 'FD to wLPT (or TCX)' of FIG. 37.

FIG. 38 (*b*) illustrates the change of 'STOP_1024_SEQUENCE' of FIG. 3, and a size of MDCT may be 1024. Here, since the size of MDCT is 1152 in FIG. 3, a window sequence has been defined as 'STOP_1152_SEQUENCE'. 'STOP_1024_SEQUENCE' of FIG. 38 (*b*) may be identical to FIG. 24, and a right portion of 'LPD_START_SEQUENCE' may be changed to each line 3805, 3806, and 3807 based on an LPD mode of 'LPD_SEQUENCE' of a next frame. A line 3808 may indicate that an interval of a region, overlapping with 'LPD_SEQUENCE', is 128 points, which is identical to a window sequence associated with 'wLPT (or TCX) or FD' of FIG. 37.

Figure 39:
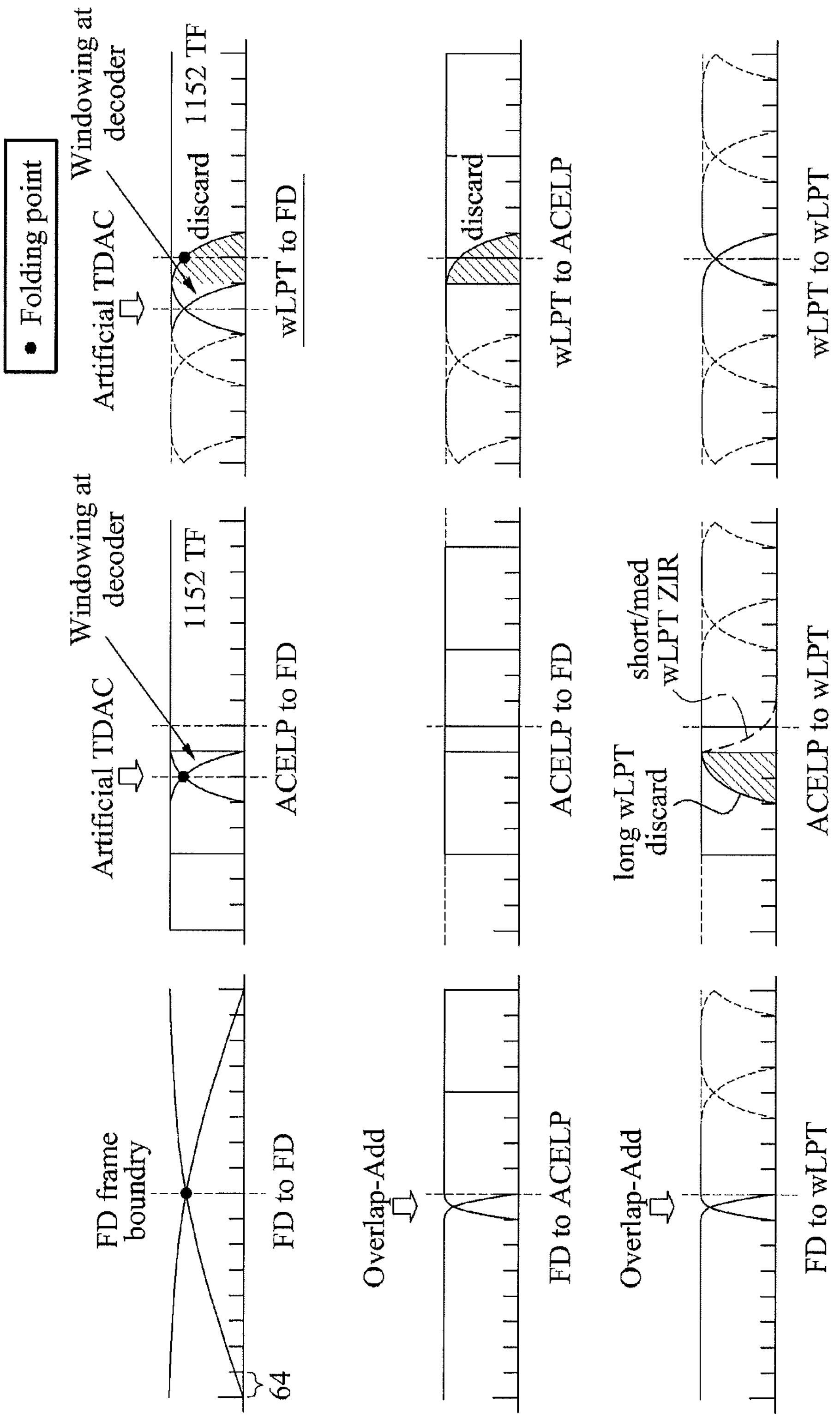
FIG. 39 is a diagram illustrating a window sequence when mode switching occurs in a conventional art.

FIG. 39 is a diagram illustrating a window sequence when mode switching occurs in a conventional art.

When mode switching occurs from a FD mode to an LPD mode, a time domain corresponding to 64 points may be overlap-added, and thus a frame alignment may be unsuitable in comparison with FIG. 37. Also, when converting wLPC (TCX) to FD, a window size of FD mode may be 2304 (a coding coefficient is 1152). Accordingly, it may be ascertained that a coding efficiency may be reduced by 64 points in comparison with a window size of 2048 (a coding coefficient is 1024) according to an embodiment of the present invention.

The present invention described above may be summed up as follows:

According to an embodiment of the present invention, a method of processing a window sequence and a window corresponding to a frame or a sub-frame in a USAC including different coding modes is provided. In this instance, a coding gain described below may be obtained.

<FD-LPD>

(1) Conventional Art a 64 point time domain overlap method may be used as a connection method of a FD frame and an LPD frame. Accordingly, residual information for 64 points may be required.

(2) Present Invention a connection method of a FD frame and an LPD frame may be an overlap-add of complement window having a same shape based on a folding point. Accordingly, a coding gain of 64 points may be obtained when mode switching occurs in comparison with a conventional art.

<LPD-FD>

(1) Conventional Art to connect an FD frame and an LPD frame, TDA may be artificially generated in a region where TDA is not generated in the LPD frame, and a 128 point FD TDA region may be overlapped. Also, 'STOP_1152_Window' may be used to restore a 64 point data rate that has been lost when FD is changed to LPD. That is, an MDCT transform size may be 2304. Such MDCT may not be a second order, and may not be easily embodied.

(2) Present Invention a TDA region, generated in an LPD frame, and a TDA region, generated in a FD frame, may be overlapped.

a window of a FD frame may be referred to as 'STOP_1024_Window', and an MDCT transform size may be 2048. That is, a transform size may be reduced, and may be a second order size. Accordingly, complexity of coding may be reduced in comparison with a conventional art, a number of coding coefficients for targeting may be reduced, and thus a coding efficiency (1152-1024) may be improved.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A signal processing method processed by a processor, comprising:

identifying a first window for a previous frame of an input signal;

identifying a second window for a current frame of the input signal;

modifying a slope of a left portion of the second window based on the first window; and processing the current frame using a modified second window having a modified left portion by performing overlap-add operation between the previous frame applied to the first window and the current frame applied to the modified second window, wherein the slope of the left portion of the second window corresponds to a region for performing overlap-add operation with the first window.

2. The signal processing method of claim 1, wherein the overlap-add operation is performed at a folding point with respect to the first window and the second window.

3. The signal processing method of claim 1, wherein the current frame is applied to a Linear Prediction Domain (LPD) mode and the previous frame is applied to a Frequency Domain (FD) mode.

4. The signal processing method of claim 1, wherein the current frame is applied to a Linear Prediction Domain (LPD) mode and the previous frame is applied to the LPD mode.

5. The signal processing method of claim 1, wherein the current frame is applied to Frequency Domain (FD) and the previous frame is applied to a Linear Prediction Domain (LPD) mode.

6. A signal processing method processed by a processor, comprising:

identifying a first window for a current frame of an input signal;

identifying a second window for a next frame of the input signal;

modifying a slope of a right portion of the first window based on the second window; and processing the current frame using a modified first window having a modified right portion overlap-add operation between the current frame applied to the modified first window and the next frame applied to the second window, wherein the slope of the right portion of the first window corresponds to a region for performing overlap-add operation with the second window.

7. The signal processing method of claim 6, wherein the overlap-add operation is performed at a folding point with respect to the first window and the first window.

8. The signal processing method of claim 6, wherein the current frame is applied to a Linear Prediction Domain (LPD) mode and the next frame is applied to a Frequency Domain (FD) mode.

9. The signal processing method of claim 6, wherein the current frame is applied to a Linear Prediction Domain (LPD) mode and the next frame is applied to the LPD mode.

10. The signal processing method of claim 6, wherein the current frame is applied to Frequency Domain (FD) and the next frame is applied to a Linear Prediction Domain (LPD) mode.

* * * * *